(12) United States Patent
Tamaki et al.

(10) Patent No.: US 7,139,527 B2
(45) Date of Patent: Nov. 21, 2006

(54) MULTI POINT WIRELESS TRANSMISSION REPEATER SYSTEM AND WIRELESS EQUIPMENTS

(75) Inventors: Tsuyoshi Tamaki, Hachioji (JP); Katsumi Sakai, Hitachi (JP); Takashi Yano, Tokorozawa (JP)

(73) Assignees: Hitachi, Ltd., Tokyo (JP); Hitachi Cable, Ltd., Tokyo (JP)

( * ) Notice: Subject to any disclaimer, the term of this patent is extended or adjusted under 35 U.S.C. 154(b) by 423 days.

(21) Appl. No.: 10/192,164

(22) Filed: Jul. 11, 2002

(65) Prior Publication Data

US 2003/0124976 A1 Jul. 3, 2003

(30) Foreign Application Priority Data

Dec. 28, 2001 (JP) .............................. 2001-399800

(51) Int. Cl.
H04B 7/14 (2006.01)
(52) U.S. Cl. .................... 455/16; 455/18; 455/11.1; 455/502
(58) Field of Classification Search .............. 455/7, 455/9, 10, 11.1, 15, 16, 18, 561, 522, 424, 455/500, 501, 504, 506, 502; 370/432, 338, 370/328; 375/265, 267
See application file for complete search history.

(56) References Cited

U.S. PATENT DOCUMENTS

| 6,584,080 | B1* | 6/2003 | Ganz et al. ................. 370/315 |
| 6,711,412 | B1* | 3/2004 | Tellado et al. .............. 455/506 |
| 6,785,341 | B1* | 8/2004 | Walton et al. .............. 375/267 |
| 6,888,809 | B1 | 5/2005 | Foschini et al. |
| 2002/0086657 | A1* | 7/2002 | Chabas ........................ 455/424 |
| 2002/0164954 | A1* | 11/2002 | Jalali .......................... 455/67.1 |
| 2002/0173302 | A1* | 11/2002 | Baker et al. ................. 455/422 |

FOREIGN PATENT DOCUMENTS

| JP | 8265306 | 10/1996 |
| JP | 10085720 | 4/1998 |
| JP | 2001/505723 | 4/2001 |
| JP | 2003/052145 | 2/2003 |

(Continued)

OTHER PUBLICATIONS 2001-505723 (English equivalent WO 98/09381).

Primary Examiner—Edward F. Urban
Assistant Examiner—John J. Lee
(74) Attorney, Agent, or Firm—Mattingly, Stanger, Malur & Brundidge, P.C.

(57) ABSTRACT

A communication system having an excellent communication path capacity characteristic even in an insight transmission environment in which a transmitter and a receiver can see each other directly in an MIMO communication system and a wireless communication device for the communication system, including: a wireless device having a transmitter for distributing transmission data including encoded data and a training signal to a plurality of antennas, and transmitting the data as radio signals from the plurality of antennas at a predetermined timing; a plurality of wireless devices having repeaters each for receiving the radio signal, storing the radio signal into a buffer so that the radio signal is delayed by predetermined time, and transmitting the radio signal delayed; and a wireless device having a receiver for receiving the radio signals from the plurality of second wireless devices by a plurality of antennas and demodulating the encoded data by using the training signal multiplexed on the received radio signal. Each wireless device determines whether relaying operation is necessary or not and transmits a control signal for controlling the relaying operation.

16 Claims, 20 Drawing Sheets

FOREIGN PATENT DOCUMENTS

WO 9809381 3/1998

\* cited by examiner

FIG. 7a

RELAY START DEMAND, RELAY STOP DEMAND
: MOBILE STATION —> BASE STATION

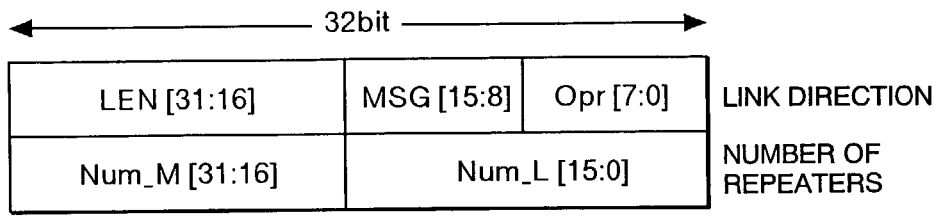

RELAY START DEMAND : LEN=0x02, MSG=0x01, Opr=0x01,
RELAY STOP DEMAND  : LEN=0x02, MSG=0x02, Opr=0x01,

FIG. 7b

RELAY OPERATION DIRECTIONS (START RELAY, UPDATE PARAMETERS)
: BASE STATION —> MOBILE STATION, REPEATER STATION

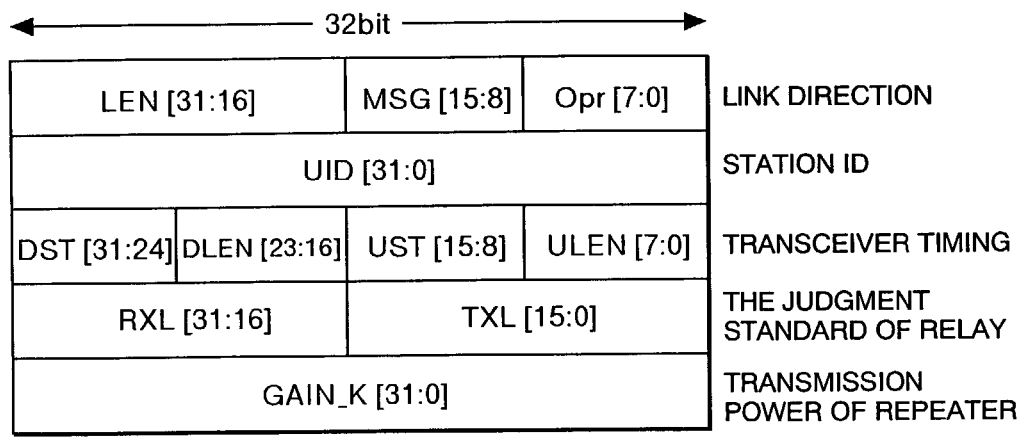

START RELAY      : LEN=0x05, MSG=0x03, Opr=0x02, ···
UPDATE PARAMETERS : LEN=0x05, MSG=0x04, Opr=0x02, ···

FIG. 7c

RELAY OPERATION DIRECTIONS (STOP RELAY)
: BASE STATION —> MOBILE STATION, REPEATER STATION

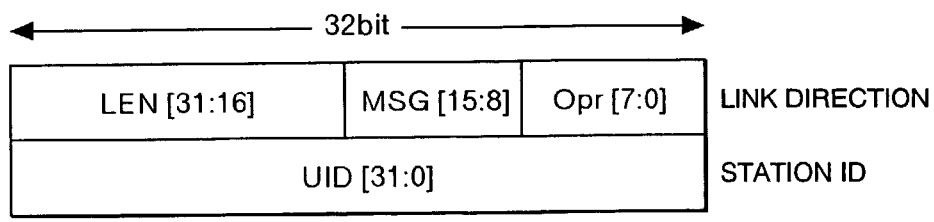

STOP RELAY : LEN=0x02, MSG=0x05, Opr=0x02, ···

MULTI POINT WIRELESS TRANSMISSION REPEATER SYSTEM AND WIRELESS EQUIPMENTS

BACKGROUND OF THE INVENTION

1. Field of the Invention

The present invention relates to a wireless transmission repeater system and wireless equipment for use in the system. More particularly, the invention relates to a wireless transmission repeater system in which a plurality of repeaters are disposed between a transmitter and a receiver in a wireless transmission repeater system such as a mobile communication system, and wireless equipment used for the system.

2. Description of the Related Art

In a conventional mobile communication system, to improve reception sensitivity of a receiver of a radio signal transmitted via a transmission antenna from a transmitter, selective diversity reception of employing two reception antennas and using a reception signal from the antenna of a higher signal-to-noise (S/N) ratio, and synthetic diversity reception of adding signals from two reception antennas in accordance with the S/N ratio are known. In a 3GPP (Third Generation Partnership Project) as one of standardization organizations of third-generation mobile communication standards, a transmission diversity technique of improving reception sensitivity of a receiver by making a path (propagation path) of a radio signal to the receiver insusceptible to the influence of obstacles from the viewpoint of probability by transmitting the same signal from two transmission antennas is known.

A standardization organization (3GPP2) examining a communication system different from the 3GPP has proposed a communication system (MIMO: Multiple Input Multiple Output) such that, as shown in FIG. 1, a transmitter 101 transmits transmission data so as to be distributed to M pieces of antennas, radio signals arriving via transmission paths H are received via N antennas by a receiver 102, and M transmission signals are obtained from N reception signals by signal processing, thereby obtaining received data.

The principle of the MIMO system will be described. When M transmission signal vectors distributed by the transmitter 101 are set as s=(s1, s2, ..., sM), a signal is transmitted from a transmission antenna "i" is multiplied by hji and a resultant signal is received by a reception antenna "j", a reception signal xj by the receiving antenna "j" is expressed by the following expression (1).

$$xj=\{\Sigma(hji \times si)\}+vj \ \{i=1 \ \text{to} \ M\} \quad (1)$$

where vj denotes noise which occurs at the reception antenna "j" in the receiver 102. When a matrix H of N rows and M columns using hji as an element, reception signal vector x=(x1, x2, ..., xN), and noise vector v=(v1, v2, ..., vN) which occurs in the receiver 102 are used, the expression (1) can be expressed as the following expression (2).

$$x=Hs+v \quad (2)$$

When the propagation path matrix H and the noise vector v in the expression (2) are known, a transmission signal "s" can be obtained from the reception signal "x". However, the propagation state between the transmitter 101 and the receiver 102 changes according to time and a place of communication, so that the propagation path matrix H is not determined unconditionally. Consequently, a training signal is multiplexed on a transmission signal, the training signal is received by the receiver 102, and an action matrix W for obtaining the transmission signal from the received signal is calculated. By obtaining the action matrix W, the state of the propagation path matrix H and the noise vector "v" is learned by training. By using the reception signal "x" which is received after the training period and the action matrix W, an estimation value s' of the transmission signal can be expressed by the following equation (3).

$$s'=W^T x \quad (3)$$

According to the MIMO system, data of an amount which is ideally larger by the number (M times) of transmission antennas as compared with the system of sending transmission data from a single antenna can be transmitted. Consequently, the MIMO system is expected as a system of a large communication capacity per a radio frequency band (high frequency use efficiency).

As shown in FIG. 2A, in the case where many buildings exist as in cities, radio signals from the transmitter 101 are reflected by many buildings and arrives at the receiver 102 via various paths. Such propagation paths will be called a multipath transmission environment. As shown in FIG. 2B, transmission paths in which no obstacles and buildings by which a signal is reflected exist between the transmitter 101 and the receiver 102 will be called an insight transmission environment. FIG. 2C is a graph showing the characteristics of the capacity of communication path and the number of transmission/reception antennas in the MIMO system with respect to the multipath transmission environment and the insight transmission environment. It is understood from FIG. 2C that the capacity of the communication path increases in proportional to increase in the number of transmission/reception antennas in the multipath transmission environment, whereas the capacity of the communication path in the insight transmission environment is smaller than that of the multipath transmission environment and, even when the number of transmission/reception antennas increases, the capacity of the communication path does not increase. In the example shown in FIGS. 2A to 2C, when the number of transmission antennas of the transmitter 101 is 3 and the number of reception antennas of the receiver 102 is 3, reception signals x1, x2, and x3 can be expressed as the following expressions (4), (5), and (6), respectively.

$$x1=h11s1+h12s2+h13s3+v1 \quad (4)$$

$$x2=h21s1+h22s2+h23s3+v2 \quad (5)$$

$$x3=h31s1+h32s2+h33s3+v3 \quad (6)$$

In the multipath transmission environment, since a path from a transmission antenna 201a to a reception antenna 202a and a path from a transmission antenna 201b to the reception antenna 202a are different from each other, the elements h11 and h12 in the propagation path matrix have different values. On the other hand, in the insight transmission environment, as compared with the distance between the transmission antennas 201a and 201b, the distance between the transmission antenna 201a and the reception antenna 202a and the distance between the transmission antenna 201b and the reception antenna 202a are sufficiently longer. Consequently, the transmission antennas 201a and 201b seem to be almost in the same position from the reception antenna 202a, so that the propagation path matrix elements h11 and h12 have similar values. For a reason similar to the above, h11 and h13 have similar values, and h11 and h21 have similar values, so that it becomes difficult to separate the transmission signals s1, s2 and s3 from the expressions (4), (5), and (6).

Accordingly, it can be said that the MIMO system has the better communication path capacity characteristic in the multipath transmission environment as compared with the insight transmission environment. On the other hand, also in the insight transmission environment, it is desired to provide the MIMO system of a larger communication path capacity.

SUMMARY OF THE INVENTION

The invention has been achieved in such a background and its object is to provide a wireless transmission repeater system capable of assuring a communication path capacity even in the insight transmission environment in accordance with the MIMO communication system, and wireless equipment for use in the system.

To achieve the object, the invention provides an MIMO communication system, that is, a wireless transmission repeater system including a wireless device having a transmitter for distributing transmission data to a plurality of antennas, and transmitting the data as radio signals from the plurality of antennas, and a wireless device having a receiver for receiving the radio signals transmitted by a plurality of antennas and reproducing the transmission data, wherein a plurality of repeater stations are disposed between the wireless device having the transmitter and the wireless device having the receiver, and one of the wireless devices has relay judging means for judging whether the repeater station is used or not, and means for transmitting a control signal for driving the repeater station on the basis of the judgment.

In a preferred embodiment of the invention, the wireless devices are a mobile station and a base station such as a portable terminal in mobile communications.

When one of the wireless devices measures a reception power or a signal-to-noise ratio of a pilot signal periodically transmitted from the other wireless device and the reception power or the signal-to-noise ratio of the pilot signal is higher than a threshold value, the relay judging means notifies the other wireless device of a control signal indicative of a demand to start relaying by the repeater station. When the reception power or the signal-to-noise ratio of the pilot signal is equal to or lower than the threshold value, the relay judging means notifies the other wireless device of a control signal indicative of a demand to stop relaying by the repeater station.

Alternately, there is also the relay judging means such that when one of the wireless devices measures a signal-to-noise ratio of a pilot signal periodically transmitted from the other wireless device, estimates a propagation path from a training signal transmitted from the one of the wireless devices, and calculates a communication capacity from the signal-to-noise ratio and the estimation of the propagation path. When the communication capacity is larger than the threshold, the control signal indicative of a demand to start relay by the repeater station is notified to the other wireless device. When the communication capacity becomes equal to or lower than the threshold, the control signal indicative of a demand to stop relaying by the repeater station is notified to the other wireless device.

Modulation to data to be transmitted and a radio signal, demodulation of the data to be transmitted from a received radio signal, and a reproducing process are substantially the same as those performed by a wireless device according to a conventional MIMO communication system. Specifically, a transmission part has means for serial-to-parallel converting encoded transmission data and distributing the data to a plurality of antennas, means for multiplexing a training signal on the transmission data so that the distributed transmission data can be restored by a receiver, means for controlling a transmission timing, and a transmitter for transmitting the transmission data as radio signals from a plurality of antennas. A reception part has means for controlling a reception timing for receiving the radio signals by a plurality of antennas, means for restoring the transmission signals distributed to the plurality of antennas from the transmitter on the basis of the training signal multiplexed on the received radio signal, means for parallel-to-serial converting the transmission signals distributed to the plurality of antennas, thereby combining the transmission signals as encoded data, and means for performing an error correcting process on the encoded data, thereby obtaining reception data.

In a multi point wireless transmission repeater system according to the invention, by disposing repeaters between a transmitter of a transmission wireless device and a receiver of a reception wireless device, a propagation path from the transmitter to the repeater and a propagation path from the repeater to the receiver are independently established. Thus, by disposing repeaters at multiple points, a propagation path characteristic similar to the multipath transmission environment can be generated. Consequently, also in an insight transmission environment in which no obstacles and no buildings do not exist between and around the transmitter and the receiver and the transmitter and the receiver can see each other directly, by artificially creating the multipath transmission environment by introducing the repeaters and maintaining the excellent characteristic of the communication path capacity, when the number of transmission/reception antennas is increased, a characteristic similar to the multipath transmission environment can be achieved.

These and other objects, feature and advantages of the present invention will become more apparent in view of the following detailed description of the preferred embodiments in conjunction with accompanying drawings.

BRIEF DESCRIPTION OF THE DRAWINGS

FIGS. 7A to 7C are diagrams each showing a message format of a control signal in an embodiment of a wireless transmission repeater system according to the invention.

DESCRIPTION OF THE PREFERRED EMBODIMENTS

Embodiments of the invention will be described hereinbelow with reference to the drawings.

Figure 1:
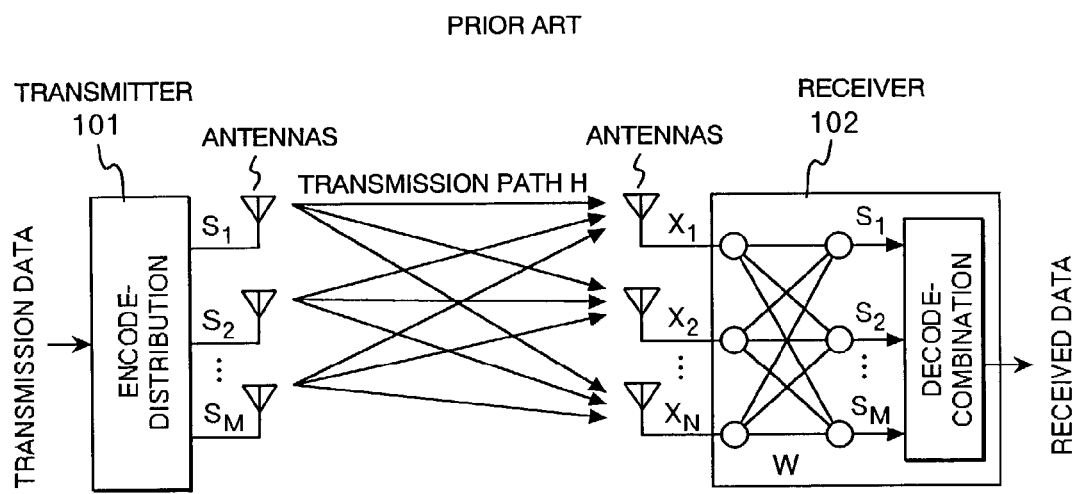
FIG. 1 is a diagram showing the configuration of a wireless transmission repeater system for explaining the principle of the MIMO system.
Figure 2A:
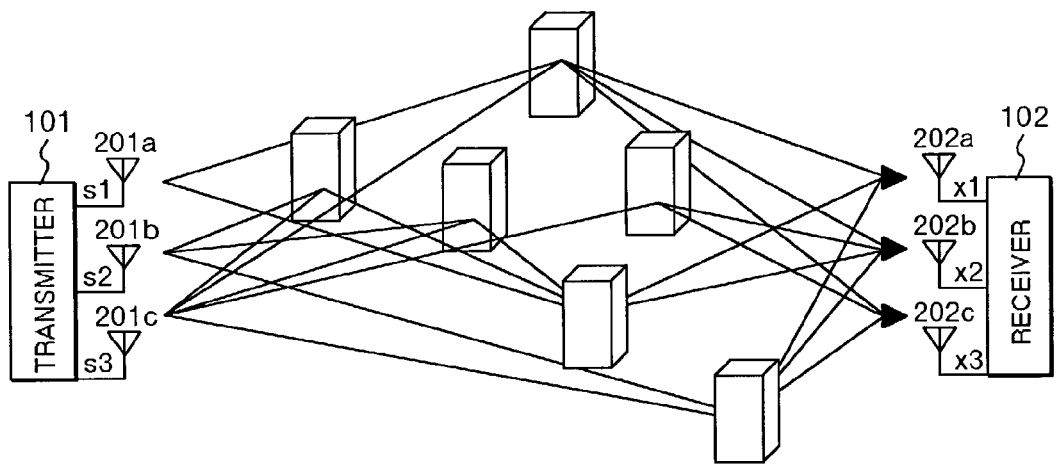
FIGS. 2A to 2C are diagrams for explaining the relation between a multipath transmission environment and a communication capacity characteristic of the MIMO system in mobile communications.
Figure 2B:
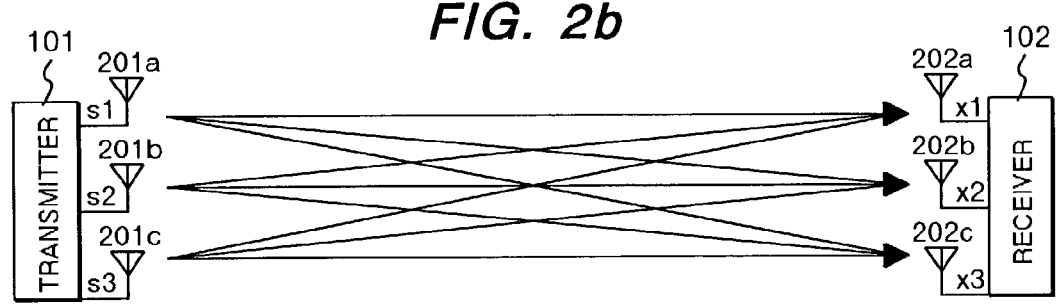
Figure 2C:
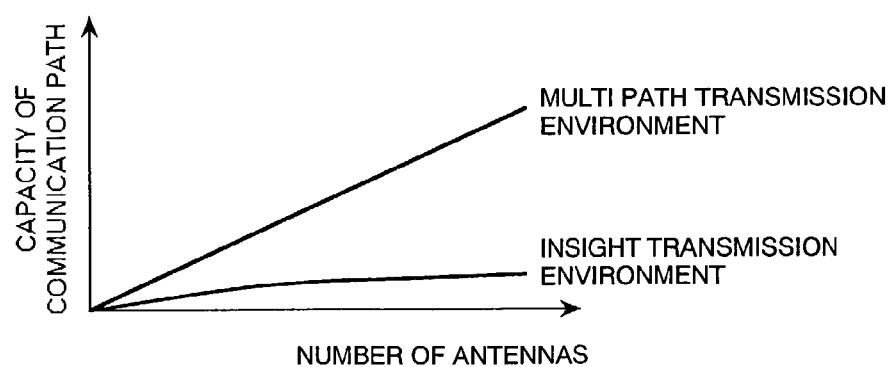
Figure 3:
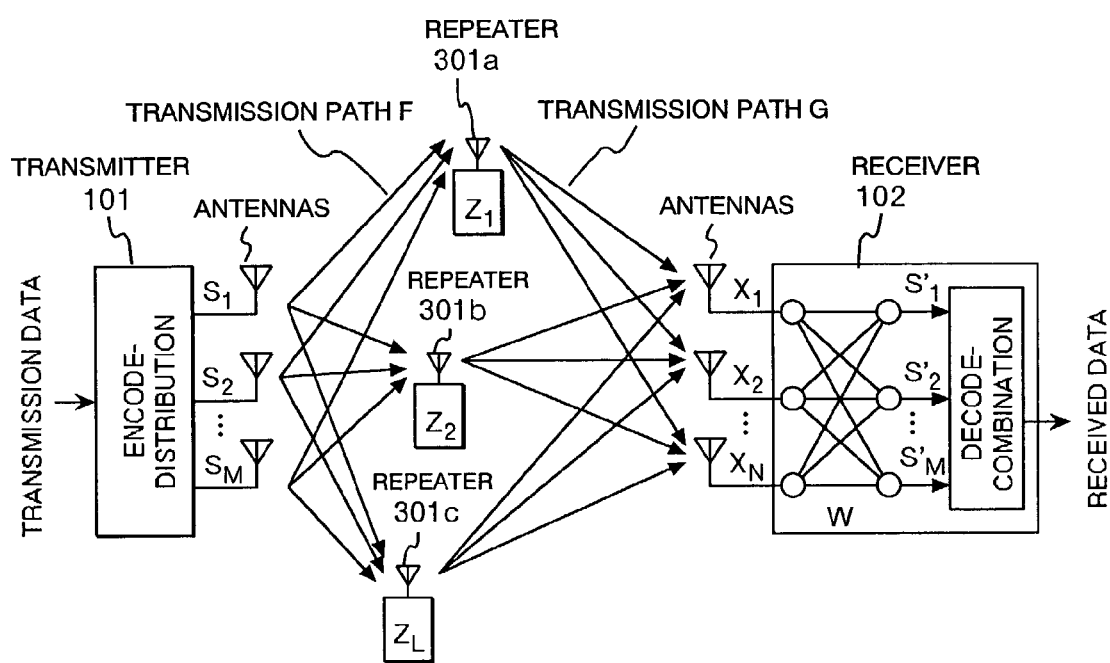
FIG. 3 is a block diagram showing the configuration of an embodiment of the wireless transmission repeater system according to the invention.

FIG. 3 is a block diagram showing the configuration of an embodiment of a wireless transmission repeater system according to the invention. The wireless transmission repeater system is constructed by: a first wireless device having a transmitter 101 for performing an encoding process for adding redundancy to transmission data so that an error of a wireless communication path can be corrected and transmitting encoded data so as to be distributed as signals s1, s2, . . . , and sM in correspondence with a plurality (M) of antennas; a plurality of second wireless devices 301a, 301b, and 301c having a plurality of repeaters for relaying the radio signals transmitted from the plurality of antennas; and a third wireless device having a receiver 102 for receiving the relayed radio signals by a plurality (N) of antennas and obtaining received data.

The signals s1, s2, . . . , and sM are stored as z1, z2, . . . , and zL in buffers of the repeaters 301a, 301b, and 301c, respectively. When a matrix indicative of the characteristic of the transmission path between the transmitter 101 and the repeaters 301a, 301b, and 301c is set as a propagation path F, the signals z1, z2, . . . , and zL stored in the repeaters 301a, 301b, and 301c can be expressed by the following expression (7) obtained from the expression (2).

$$z = Fs + v' \quad (7)$$

where v' denotes noise which occurs in the repeaters 301a, 301b, and 301c. The signals z1, z2, . . . , and zL stored in the repeaters 301a, 301b, and 301c are delayed by predetermined time by the buffers and transmitted to the receiver 102. When a matrix expressing the characteristic of the propagation paths between the repeaters 301a, 301b, and 301c and the receiver 102 is a propagation path G, the signals x1, x2, . . . , and xN received by the receiver 102 can be expressed by the following expression (8) derived from the expressions (2) and (7).

$$x = Gz + v'' = GFs + Gv' + v'' \quad (8)$$

where v'' denotes noise which occurs in the receiver 102. In order to algebraically obtain the signals s1, s2, . . . , and sM transmitted by the transmitter 101 from the expression (8), a known training signal is multiplexed on the transmission data, and the resultant is transmitted, thereby enabling a matrix W for obtaining the transmission signals s1, s2, . . . , and sM from the reception signals x1, x2, . . . , and xN to be derived by using the SMI (Sampled Matrix Inverse) method of an MMSE (Minimum Mean Square Error) which will be described hereinlater. After the matrix W is obtained, signals s1', s2', . . . , and sM' obtained by restoring the signals distributed to the M antennas by the transmitter 101 can be calculated by the following expression (9).

$$s' = W^T x \quad (9)$$

The signals s1', s2', . . . , and sM' of the M transmission antennas obtained by the expression (9) are combined, and the combined data is subjected to an error correction decoding process, thereby enabling the reception data and transmission data to be reproduced.

Figure 4:
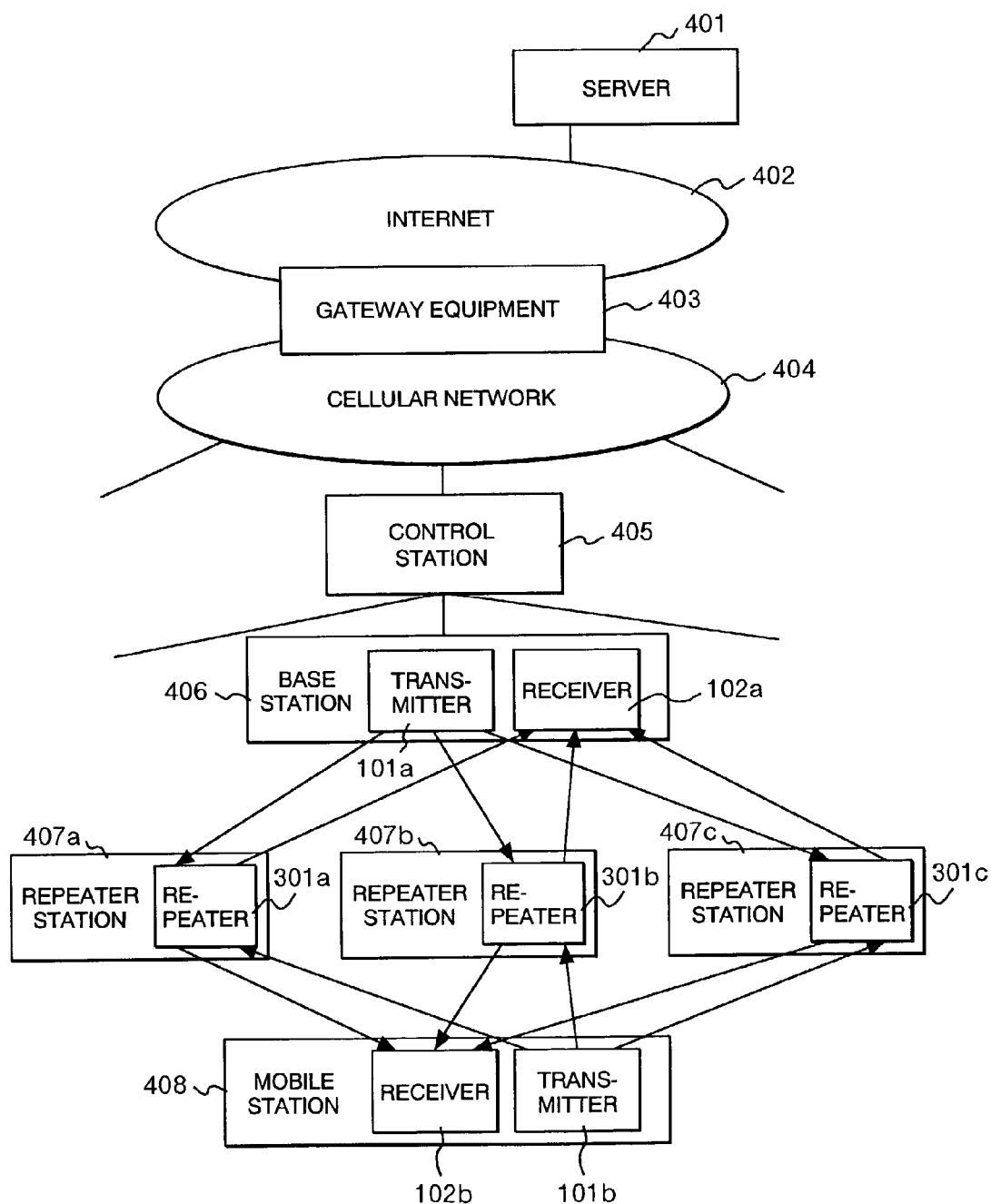
FIG. 4 is a configuration diagram of an embodiment of a mobile communication system using the wireless transmission repeater system according to the invention.

FIG. 4 is a diagram showing the configuration of an example of a mobile communication system using the wireless transmission repeater system according to the invention. Data transmitted from a transmitter 101b of a mobile station 408 is received by a receiver 102a of a base station 406 via the repeaters 301a, 301b, and 301c of repeater stations 407a, 407b, and 407c, and sent to a control station 405 for controlling the base station 406. By an application of the mobile station 408, the data sent to the control station 405 is transmitted to another mobile station via a cellular network 404 and used for speech communication or the data is connected to the Internet 402 via a gateway equipment 403 for connecting the cellular network 404 and the Internet 402, transmitted to a server 401 on the Internet, and can be used to request a service provided by the server 401. The data transmitted from the server 401 to the mobile station 408 is transmitted to the base station 406 via the Internet 402, gateway equipment 403, cellular network 404, and control station 405. Further, the data transmitted from the transmitter 101a of the base station 406 is received by the receiver 102b of the mobile station 408 via the repeaters 301a, 301b, and 301c of the repeater stations 407a, 407b, and 407c. A device serving as the repeater station may be a fixed facility of an exchange carrier or a user terminal having a speech function and a relaying function.

Figure 5:
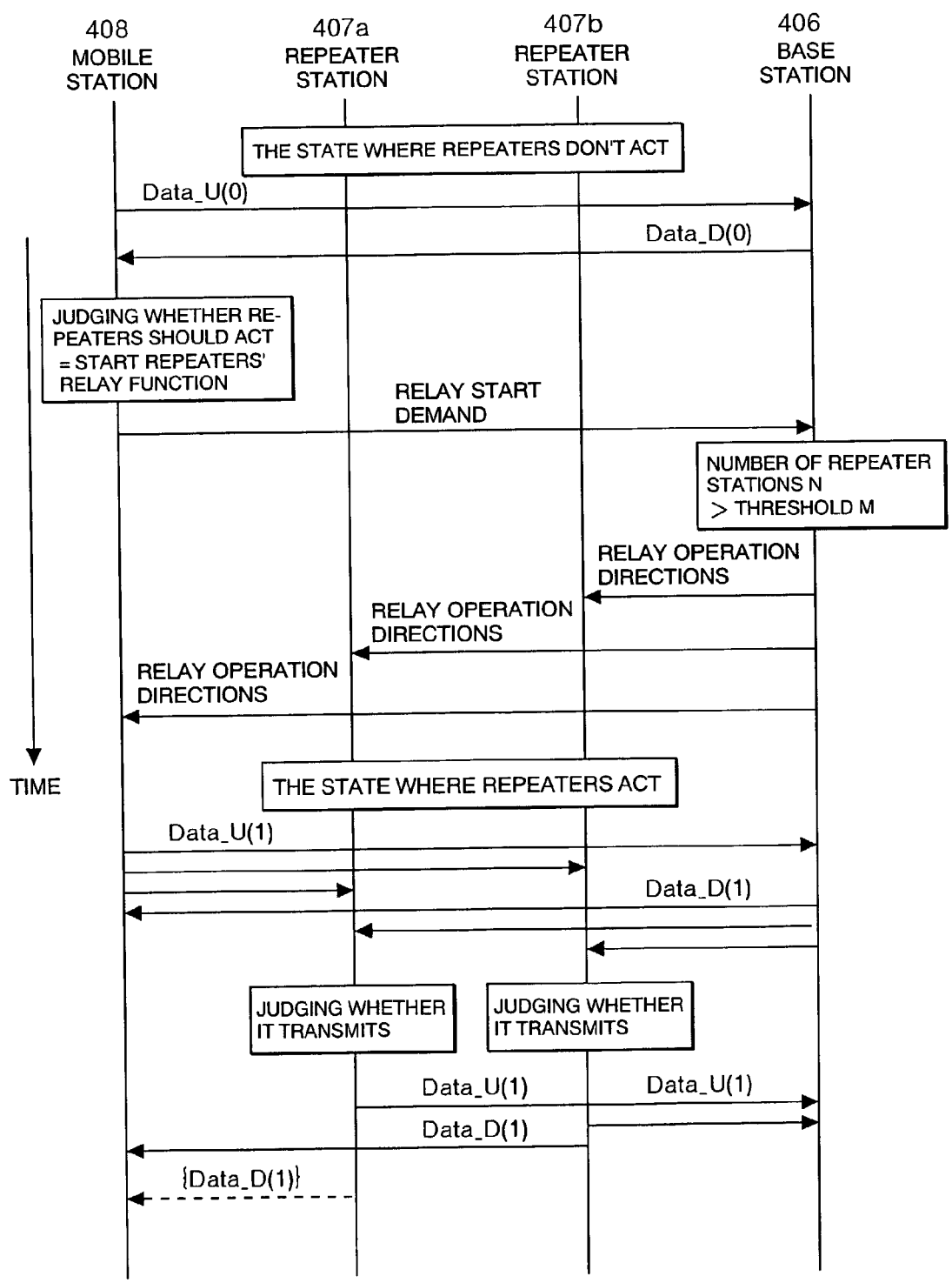
FIG. 5 is a flowchart of operations performed at the start of wireless transmission between a mobile station and a base station in FIG. 4.

FIG. 5 is a flowchart of operations at the start of wireless transmission between the mobile station and the base station in FIG. 4. A state where communication is carried out between the mobile station 408 and the base station 406 without using the repeater stations 407a and 407b will be called a state where the repeaters do not act. In the state where the repeaters do not act, the mobile station 408 determines whether relaying operation is to be performed or not.

According to a first method of the determination, a pilot signal is periodically transmitted from the base station 406, and the signal-to-noise (S/N) ratio of the pilot signal received by the mobile station 408 is measured. When the S/N ratio exceeds a threshold, the pilot signal from the base station is sufficiently large. Consequently, it is determined that the transmission path is the insight transmission path, and start of relay is determined.

According to a second method of the determination, a received power is used in place of the S/N ratio.

According to a third method of the determination, the pilot signal from the base station 406 and the training signal are periodically transmitted at predetermined timings. The capacity of a communication path is calculated by estimating a propagation path on the basis of the training signal, and the capacity of the communication path is compared with the threshold. When it is determined that the characteristic of the communication path capacity becomes better by relaying the signal, start of relaying is determined.

In the case where the start of relay is determined, a control signal indicative of a relay start demand is sent from the mobile station 408 to the base station 406. On receipt of the control signal indicative of the relay start demand, the base station 406 determines whether the number N of repeaters managed by the base station 406 satisfies the minimum number (threshold M) of repeaters required by the replay start demand or not. If it is satisfied, a control signal of relay operation directions for notifying of start of relay is transmitted to the repeater station and the mobile station. If the number N of repeater stations does not satisfy the threshold M, the base station 406 does not transmit the control signal of relay operation directions and discards the relay start demand from the mobile station 408. The mobile station 408 and the repeater stations 407a and 407b which have received the relay operation directions perform transmission/reception of data at timings designated by the relay operation directions.

When data is received from the mobile station 408 or the base station 406, the repeater stations 407a, 407b, and 407c store the data in the buffers so as to be delayed by predetermined time and transmit the delayed data. First, whether the data stored in the buffer is to be transmitted or not is determined by a method of measuring the reception power of the pilot signal periodically transmitted from the base station 406, if the received power is lower than the threshold, it is far from the base station 406. Consequently, it is determined that relaying operation produces a little effect, so that the data is not transmitted. When the reception power of the signal received from the transmitting station (mobile station 408 or base station 406) is lower than the threshold, the distance from the transmitting station is long. Consequently, it is determined that relaying operation produces little effect, and the data is not transmitted. FIG. 5 shows an example in which whether a signal Data_D(1) transmitted from the base station 406 is transmitted or not is determined by the repeater station 407a and, as a result of the determination, the signal is not transmitted to the mobile station 408.

Figure 6A:
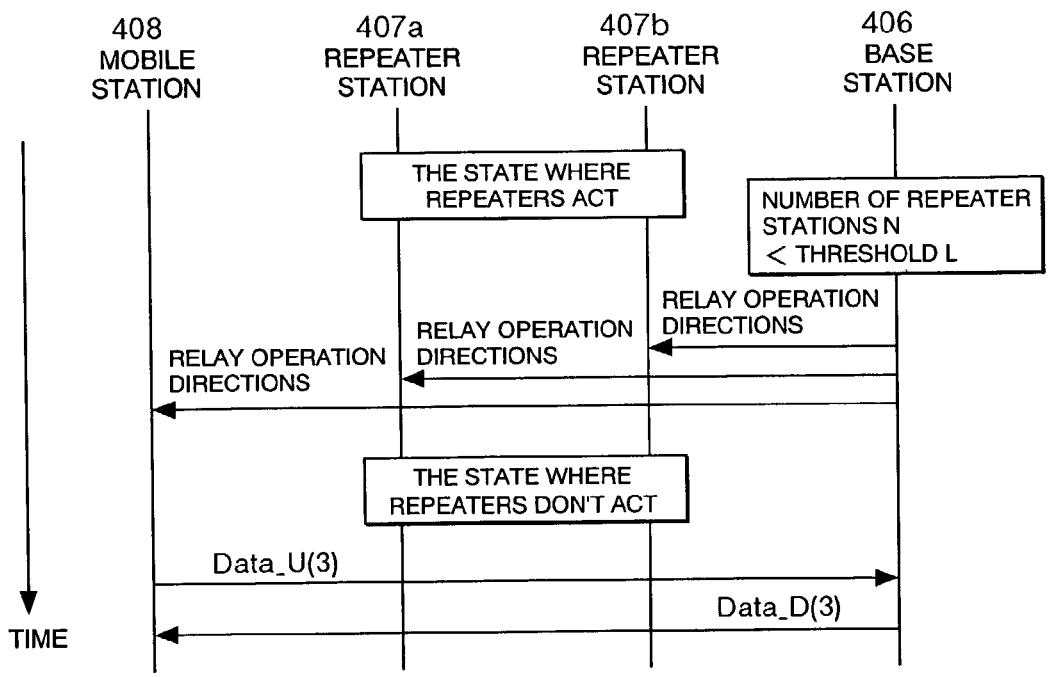
FIGS. 6A and 6B are flowcharts of operations performed when a multiple-point relay transmission in the invention is stopped.
Figure 6B:
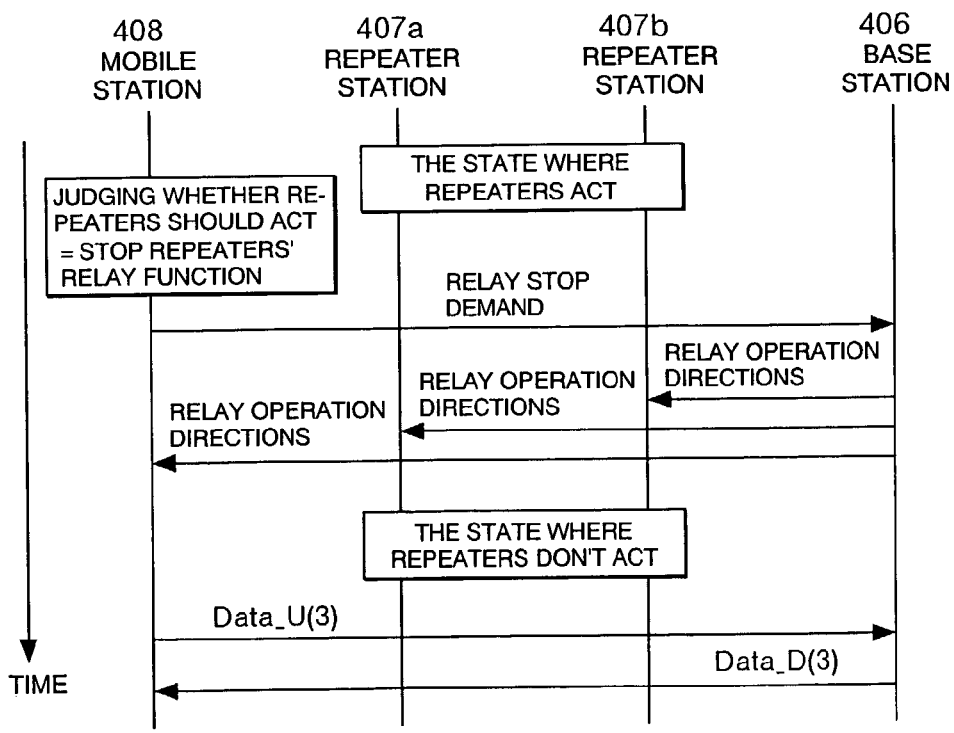

FIGS. 6A and 6B are flowcharts of operations of the case where the base station takes the initiative and the case where the mobile station takes the initiative to stop multi-point relay transmission in an embodiment of the wireless transmission repeater system according to the invention.

(a) The Case Where the Base Station Takes the Initiative

When the repeater station 407a is a user terminal having a relay function, a hand-over for switching a base station to an adjacent base station as the repeater station 407a moves may occur. At the time of performing the hand-over, control signals are transmitted between the repeater station 407a and the base station 406, so the base station 406 can grasp increase or decrease in the number of repeater stations.

Therefore, when the number N of repeater stations cannot satisfy the number (threshold L) of repeater stations necessary for the relaying operation, a control signal of relay operation directions indicative of stop of relay is transmitted from the base station 406. The mobile station 408 and relay stations 407a and 407b which have received the control signal stop the relaying operation and perform communication directly between the mobile station 408 and the base station 406.

(b) The Case Where the Mobile Station Takes the Initiative

When the relay determination is made by the mobile station 408 during the relaying operation and relay stop is determined, a control signal of relay stop demand is transmitted to the base station 406. The relay determination is made in such a manner that the S/N ratio or reception power of the pilot signal of the base station 406 is measured. When the S/N ratio or reception power becomes equal to or lower than the threshold, it is regarded that transmission environment with the base station 406 has changed from the insight transmission environment and relay stop is determined. In another method, a propagation path is estimated from the training signal, the S/N ratio is obtained from the pilot signal of the base station 406, and the capacity of the communication path is calculated on the basis of the result of estimation of the transmission path and the S/N ratio. When the capacity of the communication path becomes equal to or smaller than the threshold, it is regarded that there is no effect produced by relay transmission, and the relay stop is determined. When the relay stop demand is received from the mobile station 408, the base station 406 stops the relaying operation by issuing a control signal of relay operation directions indicative of relay stop to the repeater stations 407a and 407b and the mobile station 408.

FIGS. 7A to 7C show the formats of messages of control signals in the embodiment of the wireless transmission repeater system according to the invention. FIG. 7A shows the format of a control signal of relay start demand or relay stop demand from the mobile station 408 to the base station 406. LEN indicates the number of words when one word consists of 32 bits, MSG indicates the type of the control signal, and Opr denotes the direction of the path for relaying which is either the direction (uplink) from the mobile station 408 to the base station 406, the direction (downlink) from the base station 406 to the mobile station 408, or two-way. Num_M (threshold M) is used to determine start of relay when the number of repeater stations managed by the base station 406 is larger than Num_M. Num_L (threshold L) is used to determine stop of relay when the number of repeater stations is smaller than Num_L.

Figure 9A:
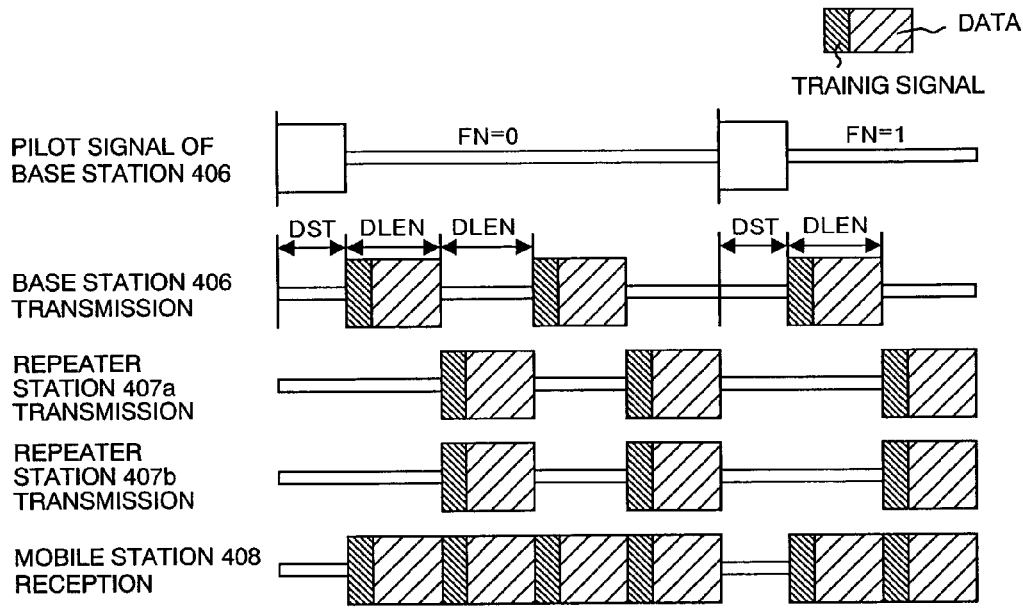
FIGS. 9A and 9B are timing charts of transmission and reception at the time of the multiple-point relay transmission in the embodiment of the wireless transmission repeater system according to the invention.
Figure 9B:
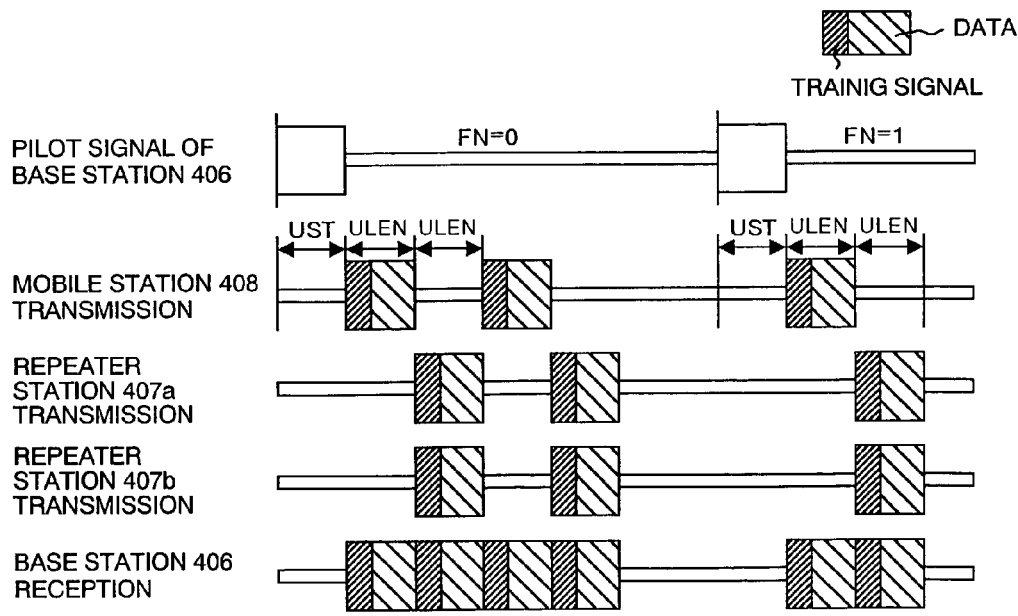

FIG. 7B shows the format of start of relay of relay operation directions from the base station 406 to the mobile station 408 and repeater stations 407a, 407b, and 407c and updating of parameters. UID indicates the ID number of each of the mobile station 408 and repeater stations 407a, 407b, and 407c. DST and DLEN specify the transmission timings of the base station 406 as shown in FIG. 9A in the direction (downlink) from the base station 406 to the mobile station 408. UST and ULEN specify the transmission timings of the mobile station 408 as shown in FIG. 9B in the direction (uplink) from the mobile station 408 to the base station 406. RXL is used to determine whether data to be relayed by the repeater stations 407a, 407b, and 407c is transmitted or not. When the reception power of the relay data is lower than RXL, the data is not relayed. TXL is used to determine whether data to be relayed by the repeater stations 407a, 407b, and 407c is transmitted or not. If the reception power of the pilot signal which is periodically sent from the base station is lower than TXL, the data is not relayed. GAIN_K is used to specify how many times the transmission power is higher than the received power of the data to be relayed by the repeater stations 407a, 407b, and 407c.

FIG. 7C is a format diagram showing stop of relay in the relay operation directions from the base station 406 to the mobile station 408 and repeater stations 407a, 407b, and 407c in the embodiment.

Figure 8:
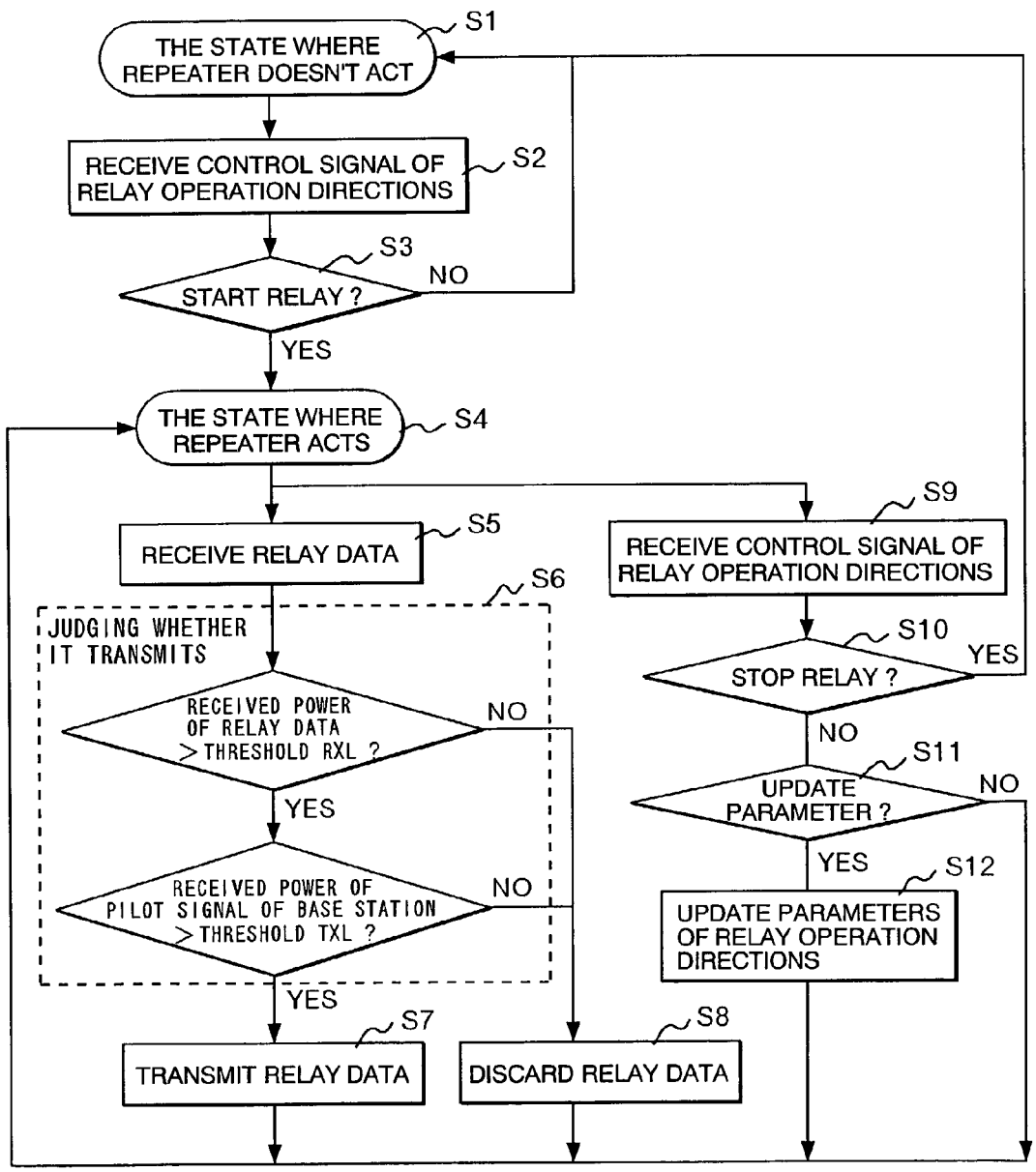
FIG. 8 is a flowchart for explaining relaying operation of a repeater station in the embodiment of the wireless transmission repeater system according to the invention.

FIG. 8 is a flowchart for explaining the relaying operation of the repeater station in the embodiment of the wireless transmission repeater system according to the invention. In the state where repeater does not act (step S1), when the control signal indicative of relay operation directions is received from the base station (S2), if the direction is start of relay, the system enters the state where the repeater acts. If the direction is stop of relay or updating of parameters, the system continues while remaining in the state where the repeater does not act (S3). In the case where the system enters the state where the repeater acts (S4), when relay data is received (S5), the data is stored in the buffer and whether the data is to be transmitted or not is determined (S6). Whether the data is transmitted or not is determined as follows. When the reception power of the relay data is higher than the threshold RXL designated by the control signal of the relay operation direction and when the reception power of the pilot signal periodically transmitted from the base station 406 is higher than the threshold TXL designated by the control signal of the relay operation direction, the data is transmitted (S7). In the other cases, the relay data is discarded (S8) for the reason that when the wireless transmission environment from the mobile station 408 or base station 406 is bad or the distance is long, the repeater station 407a determines by itself that the data should not be relayed. When transmission of the data is determined, the data is read from the buffer at a timing designated by the control signal of the relay operation directions and transmitted. In the case where the control signal of the relay operation directions is received in the relaying state (S9), the direction is determined (S10). If the direction is stop of relay, the system enters the state where the repeater does not act. If the direction is updating of parameters (S11), the relay operation parameters such as the transmission timing are updated (S12), and the relay state is maintained. If the direction is start of relay, the relay state is just maintained.

FIGS. 9A and 9B are diagrams showing transmission and reception timings at the time of multi point transmission in the embodiment of the wireless transmission repeater system according to the invention. In the direction (downlink) from the base station 406 to the mobile station 408, by using the pilot signal periodically sent from the base station 406 as a reference, a transmission signal is sent from the base station 406 at a timing deviated only by DST specified by the control signal of the relay operation directions. On the transmission signal, the training signal necessary to obtain the signal distributed by the base station 406 to the plurality of antennas by the mobile station 408 in accordance with the MIMO system and data of a user application are multiplexed. The transmission signal is transmitted for the period of DLEN specified by the control signal of the relay operation directions.

When the repeater stations 407a and 407b receive the transmission signal from the base station 406, the repeater stations 407a and 407b transmit the signal to the mobile station 408 at a timing delayed only by DLEN. In the mobile station 408, by synthesizing a reception signal received as a direct wave from the base station 406 and a reception signal received via the repeater stations 407a and 407b, reception data is restored in accordance with the MIMO system. In the direction (uplink) from the mobile station 408 to the base station 406, the transmission signal is sent from the mobile station 408 at a timing deviated from the pilot signal periodically transmitted from the base station 406 as a reference only by UST specified by the control signal of the relay operation directions. On the transmission signal, the training signal necessary to obtain the signal distributed to the plurality of antennas by the mobile station 406 by the base station 406 in accordance with the MIMO system and data of the user application are multiplexed.

The transmission signal is transmitted continuously for the period of ULEN specified by the control signal of the relay operation directions. The repeater stations 407a and 407b receive the transmission signal from the mobile station 408 and transmit the transmission signal to the base station 406 at a timing delayed only by ULEN. In the base station 406, by synthesizing the reception signal received as a direct wave from the mobile station 408 and the reception signal received via the repeater stations 407a and 407b, the reception data is restored in accordance with the MIMO system.

Figure 10:
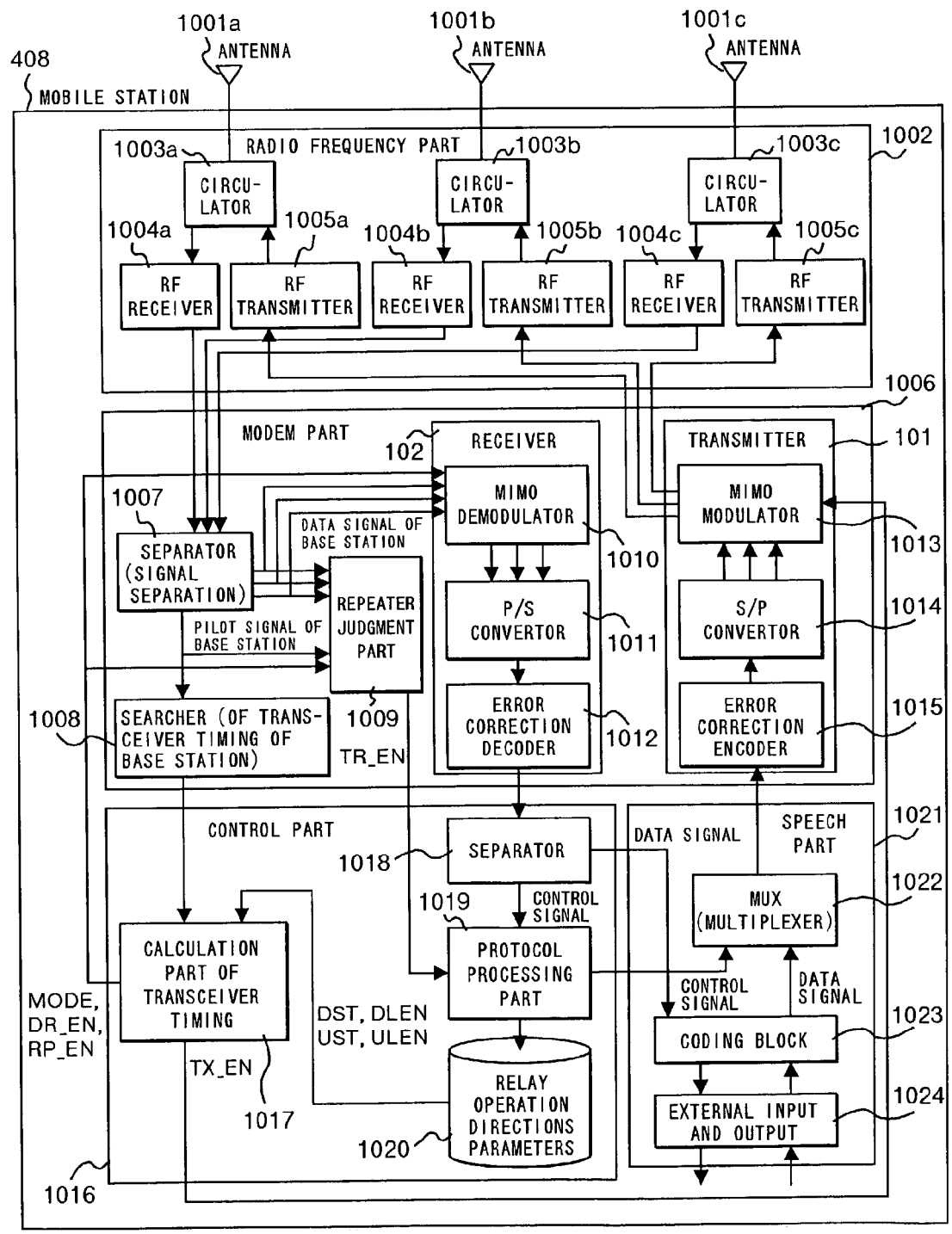
FIG. 10 is a block diagram showing the configuration of an example of a mobile station used in the wireless transmission repeater system according to the invention.

FIG. 10 is a block diagram showing the configuration of an example of the mobile station used in the wireless transmission repeater system according to the invention. The mobile station 408 is constructed by: a plurality of antennas 1001a, 1001b, and 1001c for transmitting/receiving a radio signal in a radio area; a radio frequency part 1002 for performing a filtering process on reception signals from the antennas 1001a, 1001b, and 1001c, an A/D converting process of converting an analog signal into a digital signal, a D/A converting process for converting transmission signals as digital signals sent to the antennas 1001a, 1001b, and 1001c to analog signals, a filtering process, and power amplification; a modem part 1006 having the functions of restoring the transmission signals distributed by the base station 406 to the plurality of antennas from the reception signals from the radio frequency part 1002, performing an error correcting process to obtain a reception signal, performing an encoding process for adding redundancy to the transmission signal to the radio frequency part 1002 so that error correction can be made, distributing the signals to the plurality of antennas 1001a, 1001b, and 1001c, and multiplexing the training signals to restore the signals by the base station 406; a control part 1016 for extracting a control signal from the signal received from the modem part 1006, performing a protocol process regarding call connection or relay operation, and controlling transmission/reception timings at the time of relay; and a speech part 1021 for outputting the signal received by the control part 1016 to a speaker in accordance with an external input/output interface, multiplexing an input signal from an external input/output device such as a microphone onto the control signal of the control part, and transmitting the resultant signal to the model part 1006. Each of the blocks will be described in detail in accordance with the flow of signals.

The radio signals received by the antennas 1001a, 1001b, and 1001c are distributed to RF receivers 1004a, 1004b, and 1004c by circulators 1003a, 1003b, and 1003c in the radio frequency part 1002. In the RF receivers 1004a, 1004b, and 1004c, the filtering process is performed on the reception signal so that the band is changed to a base band signal process band, the analog signal is converted to a digital signal (A/D conversion), and the digital signal is transmitted to the modem part 1006. In the modem part 1006, the reception signal is separated by a signal separator 1007 into a pilot signal of the base station and a data signal of the base station. In a searcher 1008 for a transceiver timing of the base station, by adding the same phase of the pilot signal of the base station, the timing of transmitting the pilot signal can be detected. In a repeater judgment part 1009, whether a relay operation is performed or not is judged. As a method of judging the relay operation, a method of determining the relay operation by comparing the S/N ratio of the pilot signal of the base station with the threshold or calculating the capacity of the communication path on the basis of the result of presumption of the propagation path of the base station signal and the S/N ratio of the pilot signal, and comparing the capacity with the threshold can be mentioned. When a trigger of start or stop of relay is generated by the repeater judgment part 1009, it is notified to a protocol processing part 1019 in the control part 1016, and a control signal of relay start demand or relay stop demand is transmitted from the mobile station 408 to the base station 406. The receiver 102 includes: an MIMO demodulator 1010 for calculating transmission signals s1', s2', . . . and sM' of the base station from the reception signals x1, x2, . . . , and xN of the base station in accordance with the MIMO system; a P/S converter 1011 for parallel-to-serial converting the transmission signal of the base station to thereby obtaining encoded data; and an error correction decoder 1012 for performing a decoding process by executing an error correction on the encoded data. The decoded reception data is separated by a separator 1018 in the control part 1016 into a control signal and data. The control signal is used for a protocol process necessary for call connection in the protocol processing part 1019 and as a control signal necessary for the invention. A control signal of relay operation directions from the base station 406 is stored as relay operation directions parameters 1020. A calculator part 1017 of transceiver timings generates timing signals (relay mode: MODE, direct wave: DR_EN, and repeater station wave: RP_EN) and a timing signal (transmission enable: TX_EN) necessary for an MIMO modulator 1013 on the basis of the pilot signal timing detected by the searcher 1008 of transceiver timing of the base station and the transmission/reception timings specified by the relay operation directions parameters 1020.

In the speech part 1021, data obtained from the separator 1018 is supplied to a coding block 1023 where, for example, sound encoded data is converted to a signal adapted to the interface of an external input and output 1024, and the resultant data is output from the external input and output 1024 via a speaker or the like. Data received from a microphone or the like is subjected to a sound encoding process by the coding block 1023 via the external input and output 1024. A multiplexer 1022 multiplexes a control signal from the protocol processing part 1019 and data from the coding block 1023 as transmission data. The multiplexed transmission data is passed to the transmitter 101.

In the transmitter 101, the transmission data is converted to encoded data on which a redundancy signal is added for error correction by an error correction encoder 1015. The encoded data is subjected to serial-to-parallel conversion by an S/P converter 1014 so that the transmission data is distributed to the plurality of transmission antennas. The training signal is multiplexed on the transmission data by the MIMO modulator 1013, and the resultant data is transmitted to RF transmitters 1005a, 1005b, and 1005c in the radio frequency part 1002. The RF transmitters 1005a, 1005b, and 1005c convert a digital signal into an analog signal (D/A conversion), performs power amplification and a filtering process, and transmits the transmission data as radio signals from the antennas 1001a, 1001b, and 1001c via the circulators 1003a, 1003b, and 1003c.

Figure 11A:
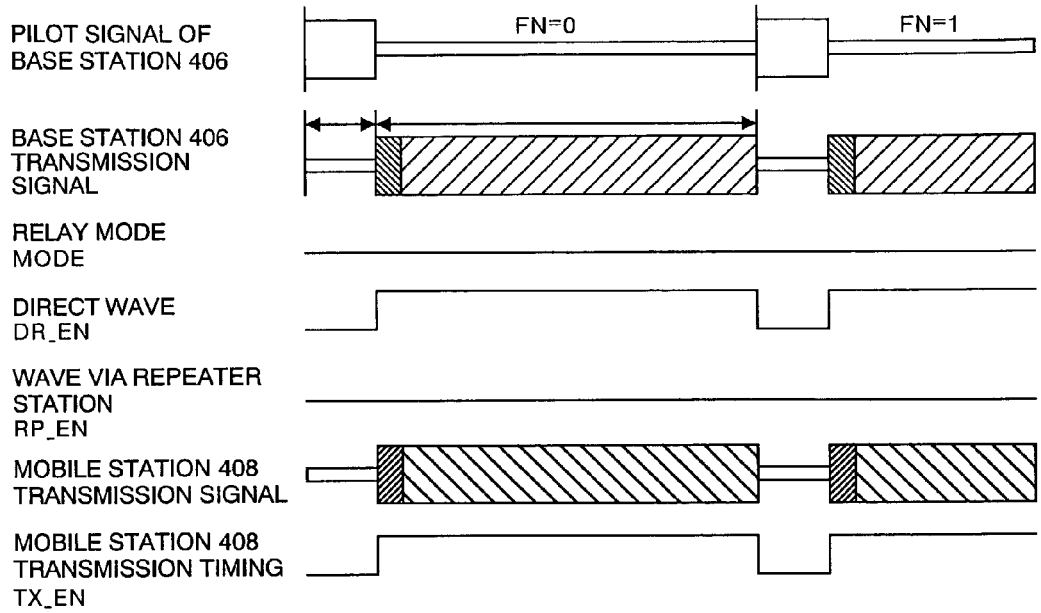
FIGS. 11A and 11B are diagrams for explaining a calculation part of transmission/reception timings in the mobile station of FIG. 10.
Figure 11B:
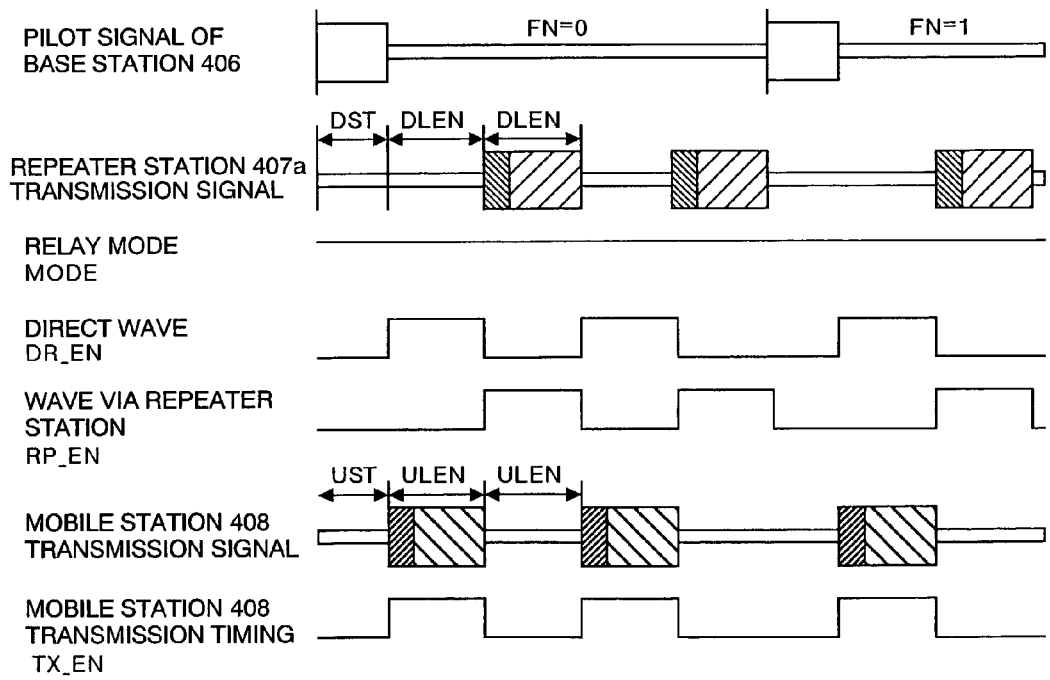

FIGS. 11A and 11B are timing charts of the calculator part 1017 of transceiver timings in the mobile station 408. FIG. 11A shows operations in the case where the repeaters do not act, and the pilot signal and the base station signal are transmitted from the base station 406. A relay mode (MODE) becomes a fixed output at a low level indicative of the state where repeaters do not act. The direct wave (DR_EN) from the base station 406 becomes a low-level output in the interval of the pilot signal and becomes a high-level output in the interval of the base station signal. A wave (RP_EN) via the repeater station as an indirect wave from the repeater stations 407a, 407b, and 407c is an output fixed at the low-level. A transmission timing (TX_EN) of the mobile station 408 becomes a low-level output in the interval of the pilot signal, and a high-level output in the interval of the transmission of the mobile station. FIG. 11B shows operations in the state where the repeaters act. The relay mode (MODE) becomes an output fixed at the high level indicative of relay. The direct wave (DR_EN) from the base station 406 becomes a high-level output from a timing deviated from the pilot signal as a reference by DST specified by the relay operation directions parameters 1020, for the interval of DLEN similarly specified by the relay operation directions parameters 1020. The direct wave (DR_EN) becomes a low-level output for the interval of the next DLEN. The direct wave alternately becomes the high level and low level until the interval of the next pilot signal.

The wave (RP_EN) via the repeater station as an indirect wave from each of the repeater stations 407a, 407b, and 407c becomes a high-level output in the interval when the DR_EN is at the low level for the interval of DLEN and becomes a low-level output in the other period. The transmission timing (TX_EN) of the mobile station 408 becomes a high-level output from a timing deviated from the pilot signal as a reference by UST specified by the relay operation directions parameters 1020, for the interval of ULEN similarly specified by the relay operation directions parameters 1020. The transmission timing goes low for the interval of the next ULEN and alternately becomes the high and low levels until the interval of the next pilot signal.

Figure 12:
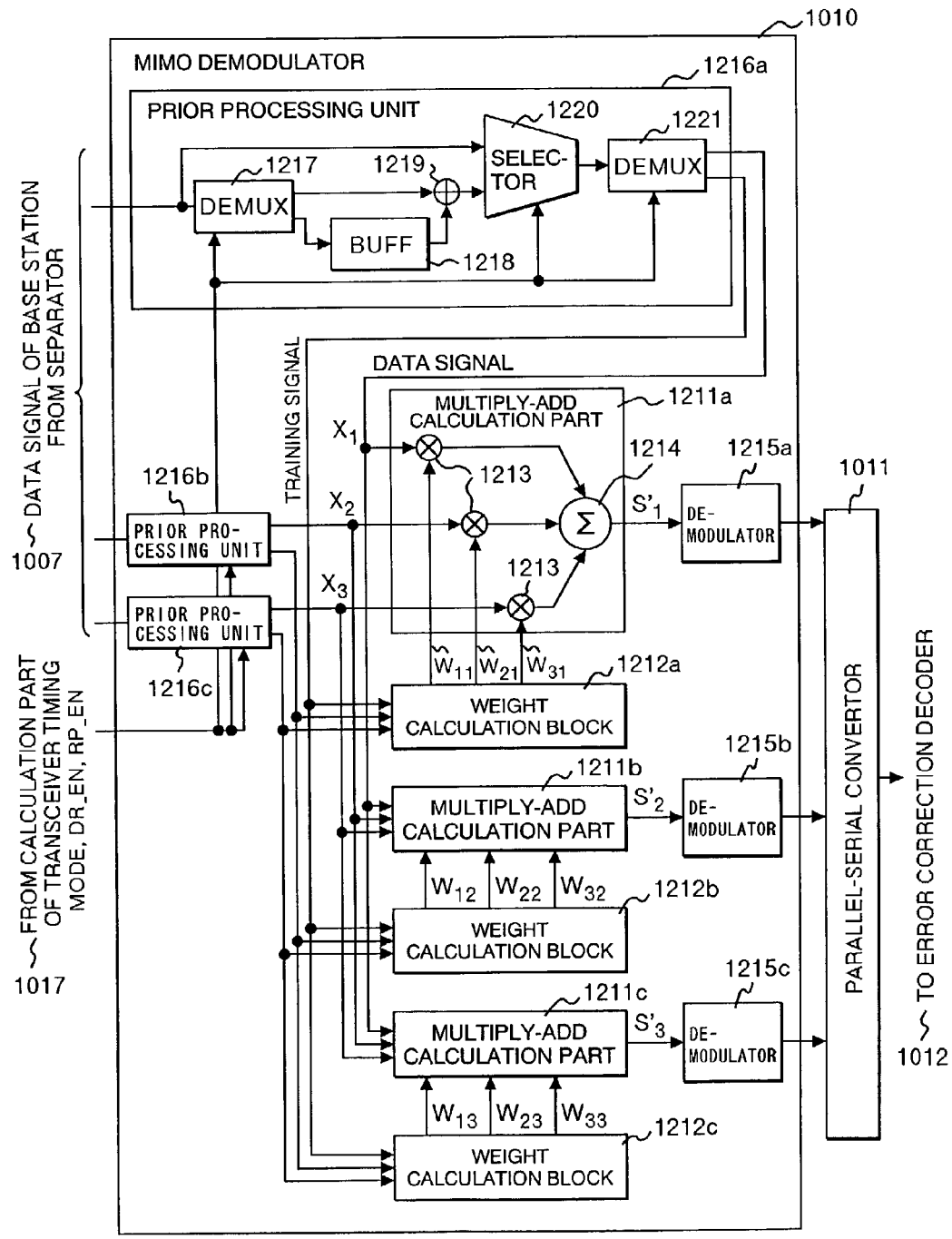
FIG. 12 is a block diagram of an MIMO demodulator and a P/S converter in an example of the mobile station according to the invention.

FIG. 12 is a block diagram showing the configuration of the MIMO demodulator 1010 and the P/S converter 1011 in the mobile station. Although FIG. 12 illustrates the configuration in the mobile station, the configuration of the MIMO demodulator and P/S converter in a base station is the same. The outline of operations will be described hereinbelow. The base station signal separated by the signal separator 1007 is transmitted to prior processing units 1216a, 1216b, and 1216c of the MIMO demodulator 1010. The configurations and operations of the prior processing units 1216a, 1216b, and 1216c are the same. At the time of relay, the base station signal processed by a demultiplexer 1217, a buffer 1218, and an adder 1219 is selected by a selector 1220. At the other times, the base station signal is selected. The detailed operations of the demultiplexer 1217, buffer 1218, and adder 1219 will be described later. The signal sent to the demultiplexer 1221 is separated by the demultiplexer 1221 into the training signal and data. The training signal is sent to weight calculation blocks 1212a, 1212b, and 1212c and the data is transmitted to multiply-add calculation parts 1211a, 1211b, and 1211c. By the weight calculation block 1212a and multiply-add calculation part 1211a, a process of obtaining an estimation value s'1 of data transmitted from the first transmission antenna is performed. In the weight calculation block 1212a, weights W11, W21, and W31 for removing components transmitted from the transmission antennas other than the first transmission antenna are calculated. By using the weights, multiply-add calculation is executed by the multiply-add calculation part 1211*a*, thereby obtaining the estimation value s'1 of the data transmitted from the first antenna. Similarly, an estimation value s'2 of data transmitted from the second transmission antenna is calculated by the weight calculation block 1212*b* and multiply-add calculation part 1211*b*. An estimation value s'3 of data transmitted from the third transmission antenna is calculated by the weight calculation block 1212*c* and multiply-add calculation part 1211*c*.

The estimation values s'1, s'2, and s'3 are demodulated by demodulators 1215*a*, 1215*b*, and 1215*c*, respectively, converted to serial data by the P/S converter 1011, and the serial data is sent to the error correction decoder 1012. The details of the weight calculation blocks 1212*a*, 1212*b*, and 1212*c* and multiply-add calculation parts 1211*a*, 1211*b*, and 1211*c* will be described. In the weight calculation block 1212*a* and multiply-add calculation part 1211*a*, the signal from the first transmission antenna is regarded as a desired wave, the signals from the transmission antennas other than the first transmission antenna are regarded as interference waves, and by applying an interference wave removing algorithm used by an adaptive array antenna, a signal from the first transmission antenna is estimated. Signals from the other transmission antennas are estimated in a similar manner. For example, in the case of using the SMI (Sampled Matrix Inverse) method in the MMSE (Minimum Mean Square Error), a weight can be obtained by calculating the following by the weight calculation blocks 1212*a*, 1212*b*, and 1212*c*.

$$R_{xx} = E[\hat{x}^* \hat{x}^T] \quad (10)$$

$$r_{xd}^{(m)} = E[\hat{x}^* \hat{s}_m] \quad (11)$$

$$w_m = R_{xx}^{-1} r_{xd}^{(m)} \quad (12)$$

By calculating the following in the multiply-add calculation parts 1211*a*, 1211*b*, and 1211*c*, the estimation values s'1, s'2, and s'3 can be obtained.

$$s_m' = w_m^T x \quad (13)$$

where

M: the number of transmission antennas

N: the number of reception antennas $\hat{s}_m$: the value of training signal transmitted from the m-th transmission antenna $s_m$: the value of data transmitted from the m-th transmission antenna $\hat{s}$: vector of the M-th order given by $\hat{s} = (\hat{s}_1, \ldots, \hat{s}_M)^T$ s: vector of the M-th order given by $s = (s_1, \ldots, s_M)^T$ $\hat{x}_n$: n-th reception antenna received value (reception value for the training signal)

$x_n$: n-th reception antenna received value (reception value for data)

$\hat{x}$: vector of the N-th order given by $\hat{x} = (\hat{x}_1, \ldots, \hat{x}_N)^T$ x: vector of the N-th order given by $x = (x_1, \ldots x_N)^T$ $R_{xx}$: correlation matrix (NXN) of the received vector $\hat{x}$ of training signal $r^{(m)}_{xd}$: correlation vector (of the N-th order) of $\hat{x}$ and $\hat{s}_m$ $w_m$: weight vector (of the N-th order) for obtaining data from the m-th transmission antenna. $w_m = (w_{1m}, \ldots w_{Nm})^T$ (•)* denotes complex conjugate and (•)$^T$ denotes transposition.

The operations of the demultiplexer 1217, buffer 1218, and adder 1219 at the time of relay will be described. The base station signal is separated by the demultiplexer 1217 into a base station signal (refer to FIG. 9, called a direct wave signal hereinlater) directly received from the antenna of the base station and a base station signal (hereinlater, called relay wave signal) transmitted after being delayed by the amount of DLEN in FIG. 9 by being once stored in the buffer 1218 and added to the relay wave signal by the adder 1219. By the processes of delay and addition, the signal transmitted from the antenna of the base station can be regarded as a signal which propagates through a propagation path obtained by synthesizing the propagation path in the state where the repeaters do not act and the propagation path in the state where the repeaters act and reaches the mobile station. Since it can be expected that the synthesized propagation path is closer to the multipath transmission environment, improvement in the capacity of the communication path can be expected. However, when the direct wave signal is much stronger than the relay wave signal, it becomes equivalent to the case where the relaying method is not used. In such a case, the adder 1219 is changed to a weighted adder to adjust the weight so that the ratio between the direct wave signal and the relay wave signal becomes proper.

Figure 13:
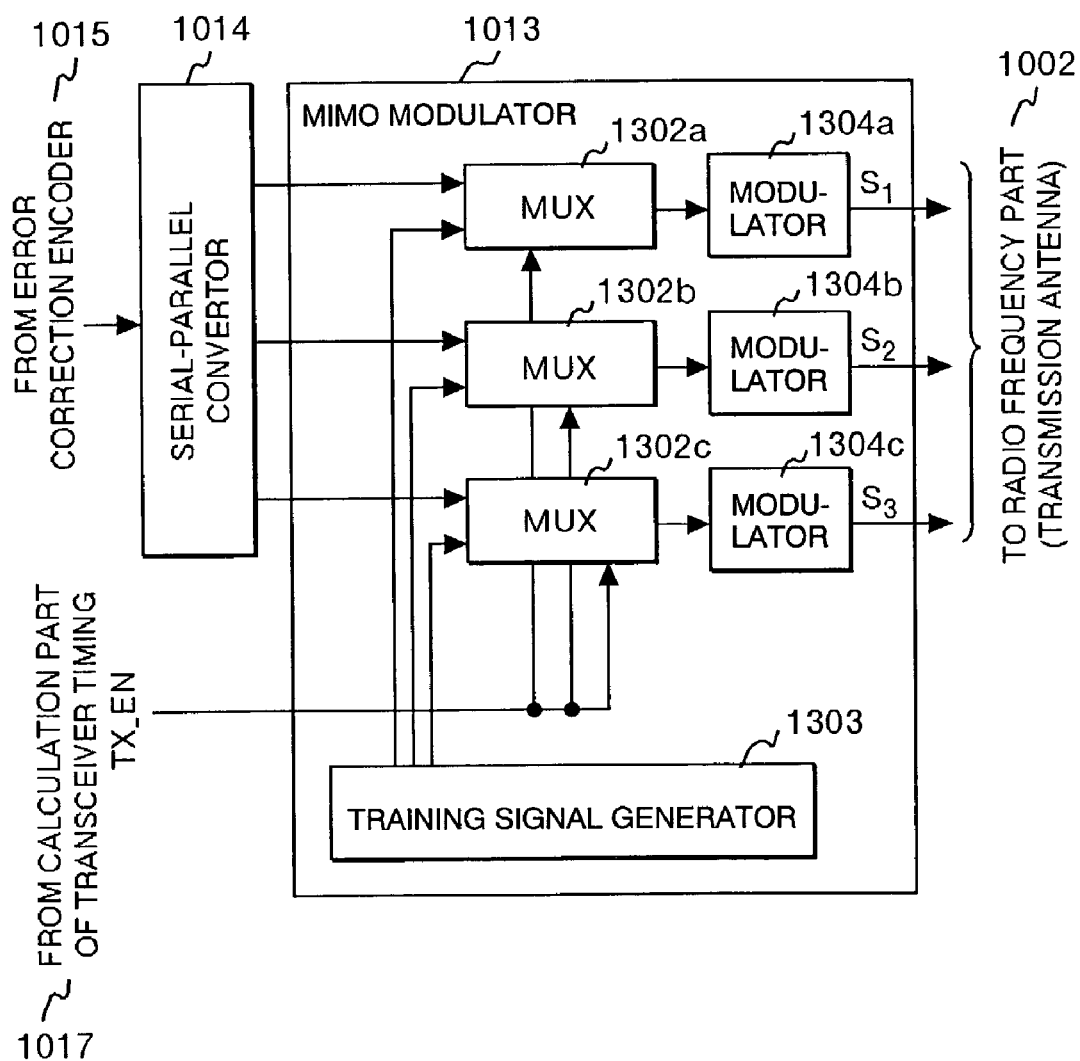
FIG. 13 is a block diagram of an S/P converter and an MIMO demodulator in an example of the mobile station according to the invention.

FIG. 13 is a block diagram showing the configuration of the S/P converter 1014 and the MIMO converter 1013 in the mobile station. Although FIG. 13 is used to explain the mobile station, the S/P converter and the MIMO modulator in the base station have the same configuration. The outline of the operation will be described. Data encoded by the error correction encoder 1015 is converted by the S/P converter 1022 to parallel data having a width corresponding to the number of transmission antennas. A training signal generator 1303 generates a training signal used to separate data transmitted from each transmission antenna on the reception side and to estimate the propagation path. The parallel data and the training signal are time-division multiplexed by a multiplexer 1302. The time division is performed at predetermined timings by using the rising edge of the TX_EN signal as a reference (FIG. 11). The time-division multiplexed signals are modulated by modulators 1304 into complex baseband signals s1, s2, and s3 which are transmitted from the antenna via the radio frequency part 1002. The training signal generated by the training signal generator 1303 will be described. To enable data to be separated on the reception side, the training signals transmitted from the antennas have to have a property of low cross-correlation. To enable the propagation path to be presumed, the autocorrelation function of the training signal has to be a delta function. For example, when the M series as a preferred pair is set as a training signal, the property is approximately satisfied.

Figure 14:
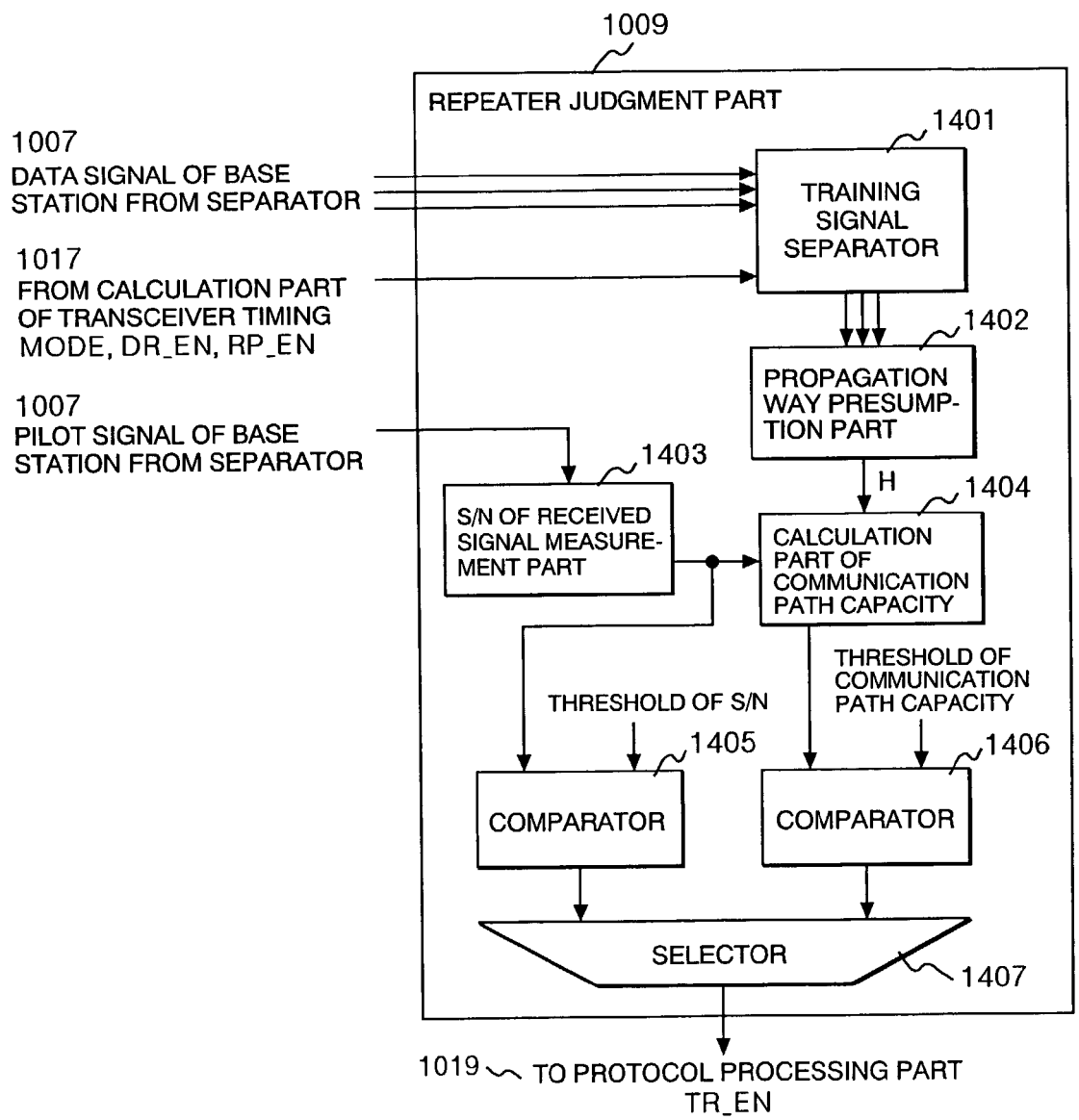
FIG. 14 is a block diagram of a repeater judgment part in an example of the mobile station according to the invention.

FIG. 14 is a block diagram showing the configuration of the repeater judgment part 1009. The repeater judgment part 1009 is a circuit for judging whether relay is performed or not. FIG. 14 shows two kinds of examples of judgment based on the S/N ratio of a received signal, and judgment based on the communication path capacity. A selector 1407 selects one of the methods.

First, in judgment based on the S/N ratio of a received signal, the fact that the S/N ratio of a received signal in the insight transmission environment is much higher than that of a received signal in the multipath transmission environment is used. The S/N ratio of the received signal measured by an S/N ratio measurement part 1403 by using the pilot signal of the base station is compared with a predetermined threshold S/N ratio by a comparator 1405. When the S/N ratio of the received signal is higher than the threshold, "start of relay" is output from the comparator 1405 and the signal TR_EN goes high. When the S/N ratio of the received signal is lower than the threshold, "stop of relay" is output and the signal TR_EN goes low.

In judgment based on the communication path capacity, the fact that the communication path capacity in the insight transmission environment is smaller than that in the multipath transmission environment is used. The training signal of a signal directly received (not relayed) by the mobile station from the base station among the base station signals is extracted by a training signal separator 1401. By using the training signal, the matrix H of a propagation way between the base station and the mobile station is presumed by a propagation way presumption part 1402. For the propagation way presumption, for example, a pulse compressing method (Shuichi Sasaoka, "Wave Summit Course, Mobile Communications", Ohmsha, pp. 47 to 48, ISBN4-274-07861-2) is used. The communication path capacity in the state where repeaters do not act is estimated by a calculation part 1404 of the communication path capacity by using the matrix H of the propagation way and the S/N ratio of the received signal. The presumed communication path capacity is compared with the predetermined threshold communication way capacity by a comparator 1046. When the presumed value is smaller, "start of relay" is output from the comparator 1406 and the signal TR_EN goes high. When the presumed value is larger than the threshold, "stop of relay" is output and the signal TR_EN goes low.

The details of the calculation part 1404 of the communication path capacity will be described. The communication path capacity C in the MIMO system is given as follows (F. R. Farrokhi, et al., "Link-Optimal Space-Time Processing with Multiple Transmit and Receive Antennas", IEEE Communications Letters, Vol. 5, NO. 3, March 2001).

$$C = \log_2 det\left(I_N + \frac{P}{MQ} HH^h\right) \quad (14)$$

where

Pm: average transmission power of the m-th transmission antenna

P: entire transmission power.

$$P = \sum_{m=1}^{M} P_m$$

Q: average noise power added to each reception antenna $I_N$: unit matrix of the N-th order H: matrix (N×M) of propagation way between transmitter and receiver C: communication path capacity [bits/Hz] per bandwidth $(\bullet)^h$ denotes complex conjugate transposition.

By using the S/N ratio of the received signal and the presumed propagation way matrix, the communication path capacity is calculated by the expression (14).

Figure 15:
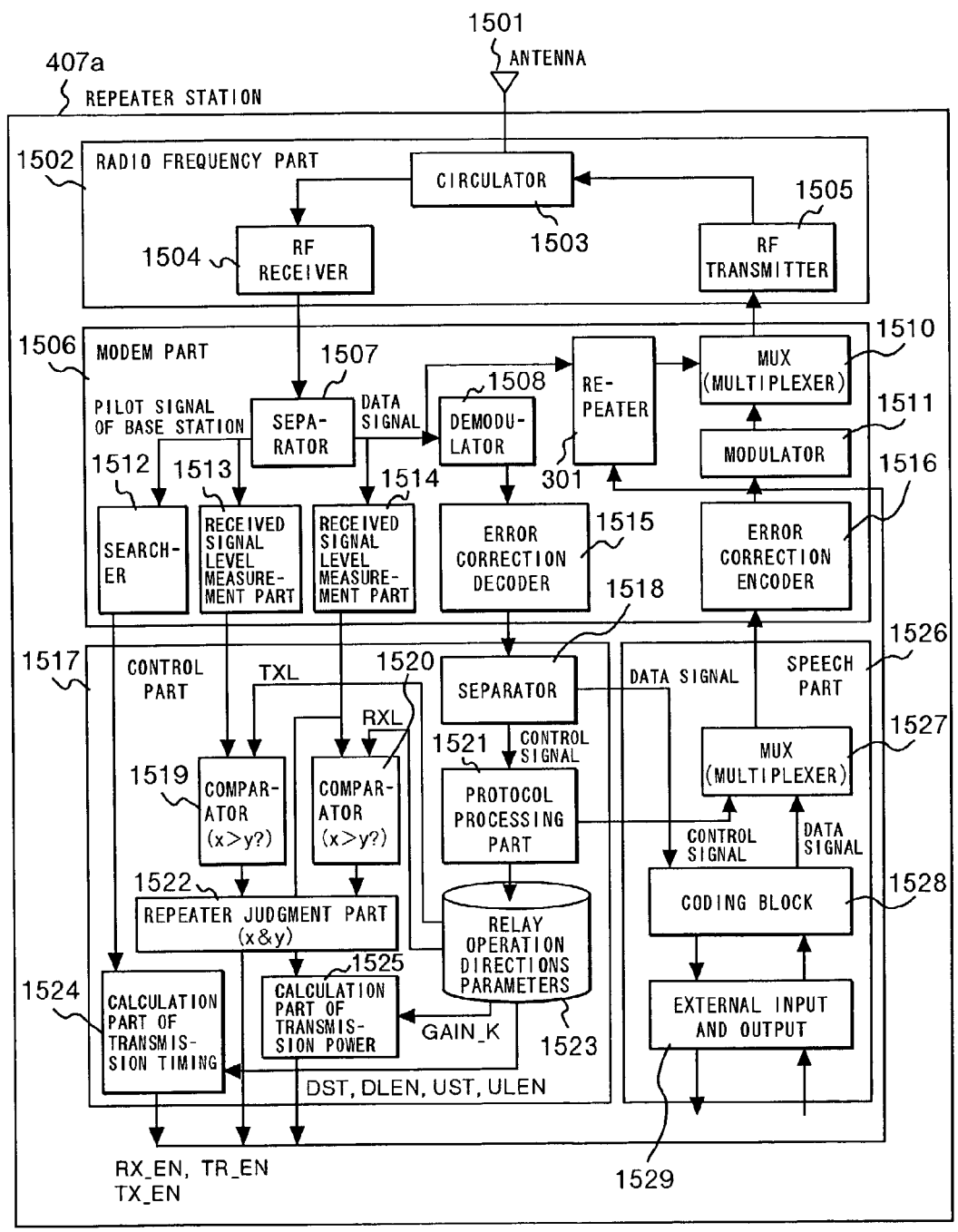
FIG. 15 is a block diagram showing the configuration of an example of a repeater station according to the invention.

FIG. 15 is a block diagram showing the configuration of an example of a repeater station according to the invention. The repeater station 407a is constructed by: an antenna 1501 for transmitting/receiving a radio signal in an radio area; a radio frequency part 1502 for performing a filtering process on a signal received from the antenna 1501, an A/D converting process of converting an analog signal to a digital signal, a D/A converting process of converting a digital transmission signal to the antenna 1501 to an analog signal, a filtering process, and power amplification; a modem part 1506 having a repeater for storing a signal received from the radio frequency part 1502 into a buffer, delaying the signal by predetermined time, and relaying the delayed signal, and having the function of performing demodulation and error correcting process for transmitting/receiving a control signal for relay to thereby obtain a reception signal, performing an encoding process of adding redundancy to the transmission signal to the radio frequency part 1002 so that error correction can be made, and modulating the signal; a control part 1517 for extracting the control signal from the reception signal obtained from the modem part 1506, performing a protocol process related to call connection or relay operation, and controlling the transmitting/receiving timing at the time of relay: and a speech part 1526 for outputting the signal received by the control part 1517 as a sound signal to a speaker so as to be adapted to an external input/output interface, multiplexing an input signal from an external input/output such as a microphone on the control signal of the control part, and transmitting the resultant to the modem part 1506.

The repeater station 407 has the configuration capable of not only processing a signal to be relayed but also multiplexing the control signal and data transmitted/received by the repeater station 407. The repeater station 407a may be a device having a plurality of antennas and performing MIMO demodulation and MIMO modulation. In the example, the repeater station does not perform a process according to the MIMO system, and it is assumed that the control signal to the repeater station is communicated by a radio signal which is not subjected to the MIMO modulation. Each of the blocks will be described in detail in accordance with the flow of a signal.

The radio signal received by the antenna 1501 is transmitted to a receiver 1504 via a circulator 1503 of a radio frequency part 1502. The receiver 1504 performs a filtering process on the received signal so that the bandwidth is converted to a base band signal processing bandwidth, converts an analog signal to a digital signal (A/D conversion), and transmits the digital signal to the modem part 1506. In the model part 1506, the reception signal is separated by a separator 1507 into the base station pilot signal and the transmission station signal. In a searcher 1512, by adding the same phase of the pilot signal of the base station, the timing of transmitting the pilot signal is detected.

The transmission station signal is stored in the buffer by the repeater 301, the relay and transmission timings are controlled by the reception enable (RX_EN) and transmission enable (TX_EN) obtained by the transmission timing calculation part in the control part 1517 and relay enable (TR_EN) obtained by a repeater judgment part 1522, and the transmission signal is set to a transmission power value obtained from a calculation part 1525 of transmission power and transmitted. To generate the signal, the transmission station signal separated by the separator 1507 is subjected to a demodulating process for demodulating a modulated signal by a demodulator 1508, and the demodulated signal is subjected to error correction and a decoding process by an error correction decoder 1515, thereby obtaining reception data. The reception data is separated by a separator 1518 in the control part 1517 into a control signal and data of the user application. The control signal is subjected to a call connection processing sequence or relay operation directions of the invention by a protocol processing part 1521. The control signal of the relay operation directions is stored as relay operation directions parameters 1523.

A received signal level measurement part 1513 measures a reception power of a base station pilot signal. If the reception power is higher than a threshold TXL of the relay operation directions parameters 1523 in a comparator 1519, relaying operation is performed. If not, the repeater judgment part 1522 determines that relaying operation is not performed. Similarly, the received signal level measurement part 1514 measures a reception power of the transmission station signal. If the reception power is higher than a threshold RXL of the relay operation directions parameters 1523 in a comparator 1520, relaying operation is performed. If not, the repeater judgment part 1522 determines that relaying operation is not performed. The calculation part 1525 of transmission power calculates a set value of transmission power by a value which is obtained by multiplying the reception power of the transmission station signal of the received signal level measurement part 1514 by "GAIN_K" times of the relay operation directions parameters 1523.

In the speech part 1526, the data separated by the separator 1518 is subjected to signal conversion adapted to the interface of an external input and output 1529 via a coding block 1528, and sound is output from a speaker or the like. A sound input signal from a microphone or the like is subjected to an information source coding process by the coding block 1528 via the external input and output 1529. In a multiplexer 1527, a control signal from the protocol processing part 1521 and data from the coding block 1528 are multiplexed, and the resultant data is transmitted to an error correction encoder 1516 of the modem part 1506.

The error correction encoder 1516 performs an encoding process for adding redundancy for performing error correction, and a modulating process according to the wireless transmission system is performed by a modulator 1511. A multiplexer 1510 multiplexes relay data from the repeater 301 and a modulated signal from the modulator 1511, and passes the multiplexed signal to an RF transmitter 1505 of the RF part 1502. The RF transmitter 1505 converts a digital signal to an analog signal (D/A conversion), performs power amplification and a filtering process, and transmits the transmission data as an RF signal from the antenna 1501 via the circulator 1503.

The repeater station can be constructed as a device dedicated to the MIMO communication system or as a wireless device having an RF transmission/reception part used for an RF communication which does not conform with the MIMO communication system.

Figure 16:
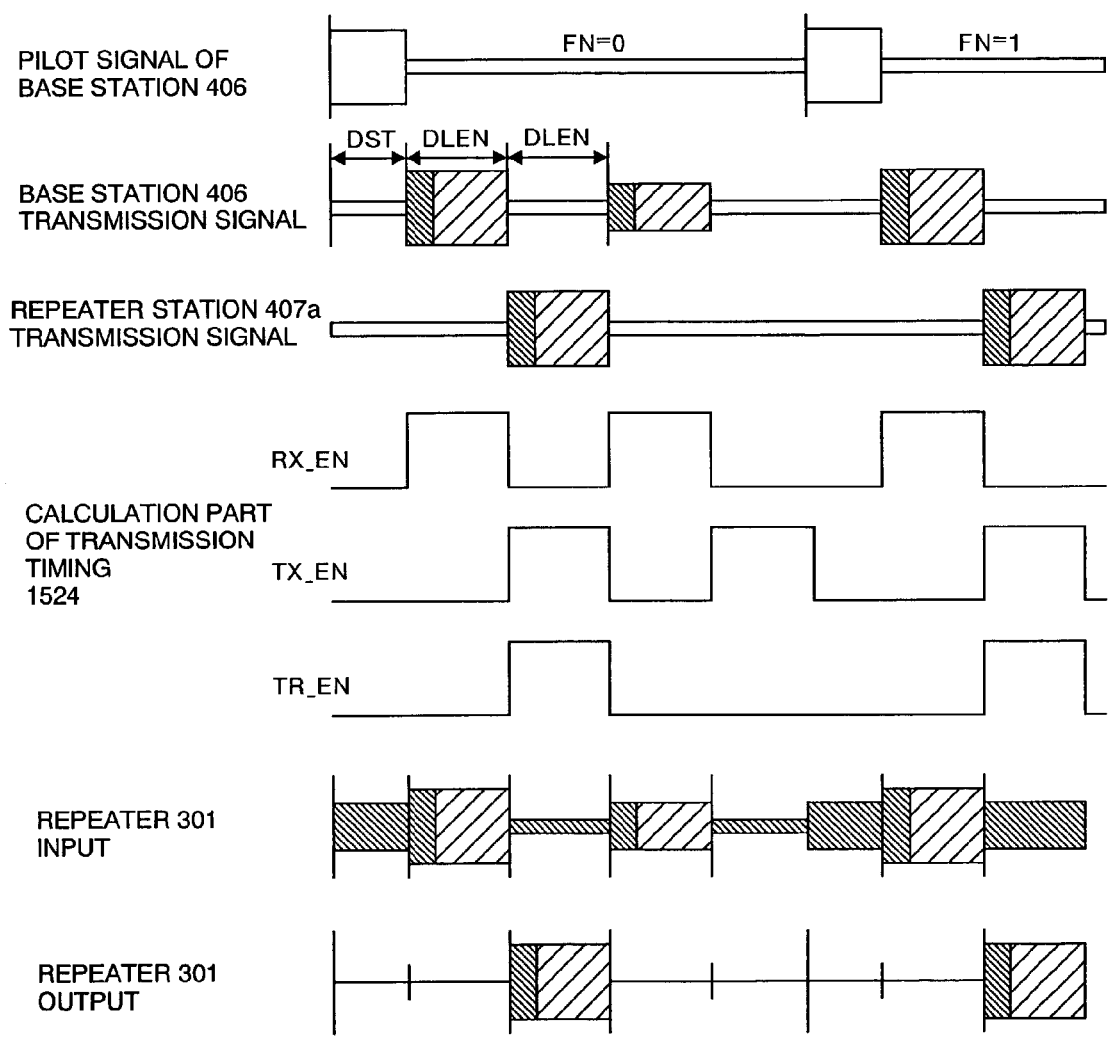
FIG. 16 is a timing chart for explaining repeater input/output timings in the repeater station of FIG. 15.

FIG. 16 is a timing chart for explaining input/output timings of the repeater 301 in the repeater station 407. In the chart, relay in the direction (downlink) from the base station 406 to the mobile station 408 will be described as an example. In a calculation part 1524 of transmission timing, a received enable signal (RX_EN) becomes a high-level output for the period of DLEN which is specified by the relay operation directions parameters 1523 from a timing deviated from the reference of the pilot signal periodically transmitted from the base station 406, which is detected by the searcher 1512 by DST specified by the relay operation directions parameters 1523, and becomes a low-level output for the period of the following DLEN. For the period up to the next pilot signal, the high level and the low level are alternately repeated for the duration of DLEN. The transmission enable (TX_EN) signal repeats the high and low levels for the duration of DLEN at timings delayed from the reception enable (RX_EN) signal by DLEN. A signal supplied to the repeater 301 is stored in the buffer at the timing when the reception enable (RX_EN) is at a high-level output. When the transmission enable (TX_EN) signal and the relay enable (TR_EN) signal obtained by the repeater judgment part 1522 are at the high level, data is read from the buffer and transmitted.

Figure 17:
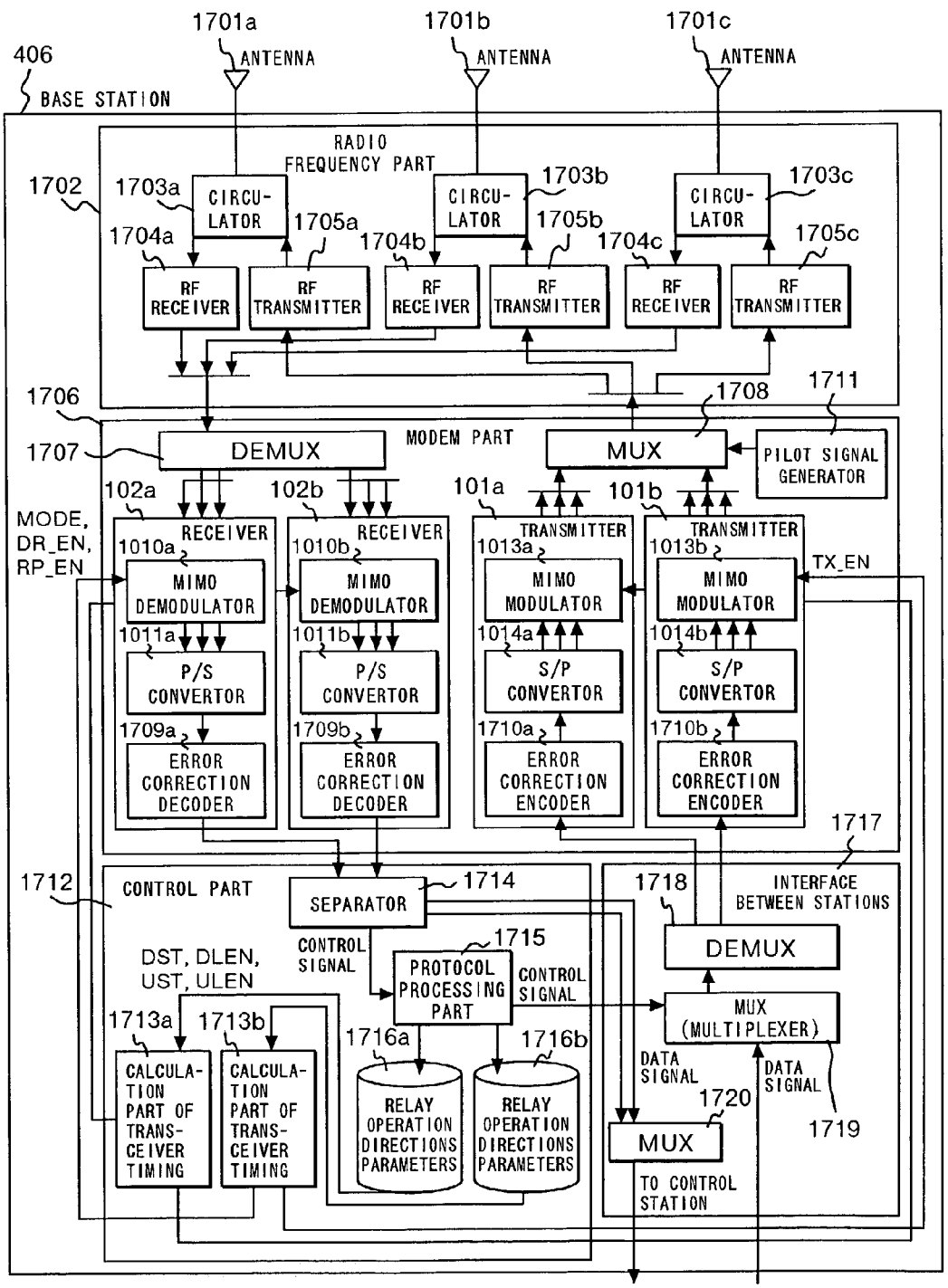
FIG. 17 is a block diagram showing the configuration of an example of a base station according to the invention.

FIG. 17 is a block diagram showing the configuration of an example of the base station according to the invention. The base station 406 is constructed by: a plurality of antennas 1701a, 1701b, and 1701c for transmitting/receiving RF signals in a radio area; a radio frequency part 1702 for performing a filtering process on signals received from the antennas 1701a, 1701b, and 1701c, an A/D converting process of converting an analog signal to a digital signal, a D/A converting process of converting a digital transmission signal to the antennas 1701a, 1701b, and 1701c to an analog signal, a filtering process, and power amplification; a modem part 1706 for restoring the transmission signal distributed to the plurality of antennas by the mobile station 408 from the signal received from the radio frequency part 1702, performing an error correcting process to obtain a reception signal, performing an encoding process of adding redundancy to the transmission signal to the radio frequency part 1702 so that error correction can be made, distributing the encoded signal to the plurality of antennas 1701a, 1701b, and 1701c, multiplexing a training signal on the signal so that the signal can be reconstructed by the mobile station 408, and generating a pilot signal necessary for the mobile station 408 and the repeater stations 407a, 407b, and 407c to generate a reference timing; a control part 1712 for extracting the control signal from the reception signal obtained from the modem part 1706, performing a protocol process related to call connection or relay operation, and controlling the transmitting/receiving timings at the time of relay: and an interface 1717 between stations, for passing the signal received from the control part 1712 to the control station 405, multiplexing a signal from the control station 405 and a signal generated from the base station 406, and passing the resultant signal to the modem part 1706. Detailed description will be made below in accordance with the flow of signals.

The radio signals received by the antennas 1701a, 1701b, and 1701c are sent to receivers 1704a, 1704b, and 1704c via circulators 1703a, 1703b, and 1703c of the radio frequency part 1702, respectively. The receivers 1704a, 1704b, and 1704c performs a filtering process on the reception signals so that the bandwidth is changed to a base band signal processing bandwidth, convert an analog signal to a digital signal (A/D conversion), and transmit the resultant to the modem part 1706. In the modem part 1706, the reception signal is separated by a demultiplexer 1707 for each mobile station and distributed to the receivers 102a and 102b. In the receivers 102a and 102b, the transmission signals distributed by the mobile station to the plurality of antennas are restored by the MIMO demodulators 1010a and 1010b, the restored transmission signals of the number of the plurality of antennas are converted to the encoded data by the P/S converters 1011a and 101b, and a decoding process for performing error correction on the encoded data is performed by error correction decoders 1709a and 1709b, thereby obtaining reception data. The reception data is passed to the control part 1712 and separated by a separator 1714 into a control signal and data of the user application. The control signal is dealt by a protocol processing part 1715 which performs a protocol processing for call connection or relay operation. The data of the control signal of relay operation directions issued for each user is held as relay operation directions parameters 1716a and 1716b. On the basis of timing parameters (DST, DLEN, UST, and ULEN) defined here, timing signals (relay mode: MODE, direct wave: DR_EN, and repeater station wave: RP_EN) necessary for the MIMO demodulators 1010a and 1010b and timing signals (transmission enable: TX_EN) necessary for the MIMO modulator 1013b are generated by calculation parts 1713a and 1713b of transmission/reception. Data of a plurality of user applications separated by the separator 1714 is multiplexed by a multiplexer 1720 in accordance with the interface 1717 between stations and the resultant data is transmitted to the control center 405. Data received from the control center 405 and a control signal generated by the protocol processing part 1715 are multiplexed by a multiplexer 1719, and distributed by demultiplexer 1718 to the transmitters 101a and 101b for each of the users.

In the transmitters 101a and 101b, the transmission data is converted by error correction encoders 1710a and 1710b to encoded data to which redundancy is added so that error correction can be made in the mobile station 408. The encoded data is serial-to-parallel converted by the S/P converters 1014a and 1014b, thereby distributing the resultant data as transmission signals to the plurality of antennas 1701a, 1701b, and 1701c of the base station 406. A training signal is added to the transmission signal by the MIMO modulators 1013a and 1013b so that MIMO demodulation can be carried out by the mobile station 408. Transmission data of the transmitters 101a and 101b and the pilot signal generated by a pilot signal generator 1711 are multiplexed by a multiplexer 1708, and the transmission data is supplied to each of transmitters 1705a, 1705b, and 1705c of the radio frequency part 1702.

In the transmitters 1705a, 1705b, and 1705c, the transmission data is A/D converted from a digital signal to an analog signal, a filtering process, and power amplification are performed, and the transmission data is transmitted as a radio signal from the antennas 1701a, 1701b, and 1701c via the circulators 1703a, 1703b, and 1703c. In the above description, the MIMO demodulators 1010a and 1010b of the receivers 102a and 102b have the same configuration as that described in FIG. 12, and the MIMO modulators 1013a and 1013b in the transmitters 101a and 101b have the same configuration as that described with reference to FIG. 13.

Figure 18A:
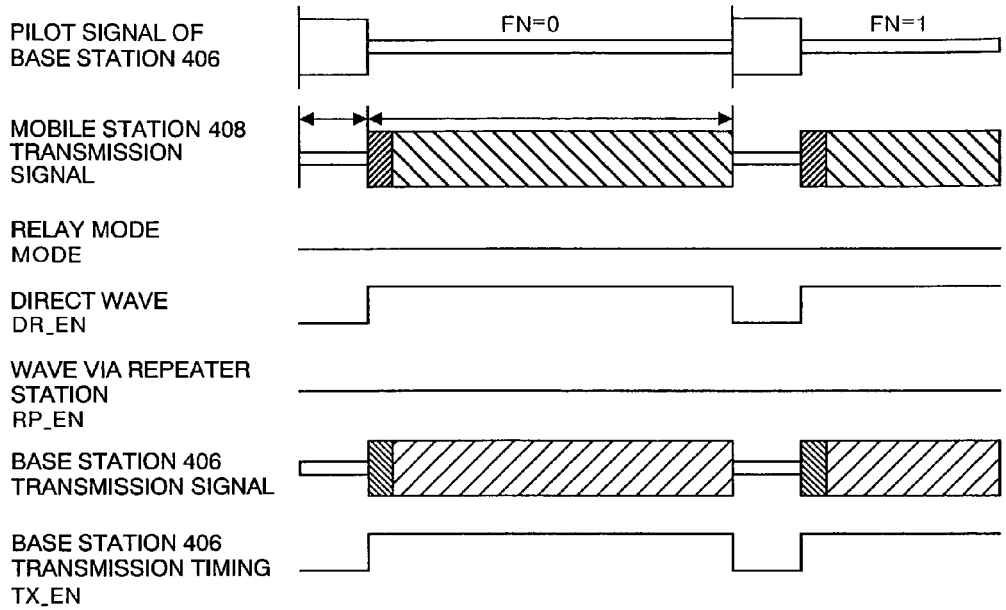
FIG. 18 is a timing chart of a calculation part of transmission/reception timings in the base station of FIG. 17.
Figure 18B:
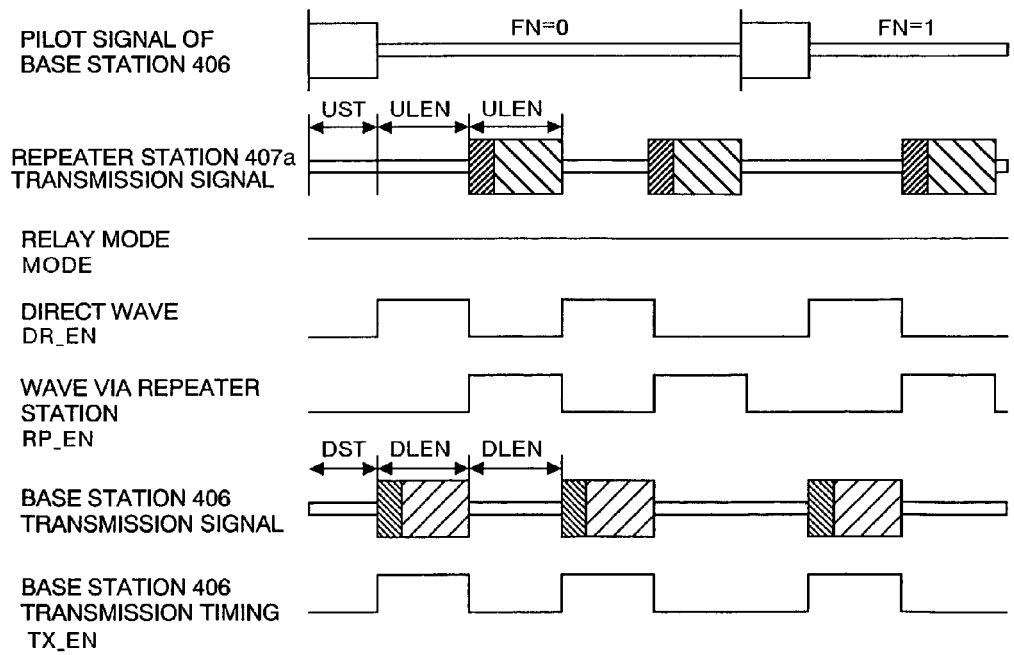

FIGS. 18A and 18B are timing charts for explaining the operation of the calculator part of transceiver timings in an example of the base station according to the invention. FIG. 18A shows operations in the state where repeaters do not act. The relay mode (MODE) becomes a fixed output at a low level indicative of the state where repeaters do not act. The direct wave (DR_EN) from the mobile station 408 becomes a low-level output in the interval of the pilot signal and becomes a high-level output in the interval of the mobile station signal. A wave (RP_EN) via the repeater station as an indirect wave from the repeater stations 407a, 407b, and 407c is an output fixed at the low-level. A transmission timing (TX_EN) of the base station 406 becomes a low-level output in the interval of the pilot signal, and a high-level output in the base station broadcast time.

FIG. 18B shows operations in the state where the repeaters act. The relay mode (MODE) becomes an output fixed at the high level indicative of relay. The direct wave (DR_EN) from the mobile station 408 is a high-level output from a timing deviated from the pilot signal as a reference by UST specified by the relay operation directions parameters 1716a, for the period of ULEN similarly specified by the relay operation directions parameters 1716a. The direct wave (DR_EN) becomes a low-level output for the period of the next ULEN. The direct wave alternately becomes the high level and low level until the interval of the next pilot signal. The wave (RP_EN) via the repeater station as an indirect wave from each of the repeater stations 407a, 407b, and 407c becomes a high-level output in the interval where the DR_EN is at the low level for the period of ULEN and becomes a low-level output in the other period. The transmission timing (TX_EN) of the base station 406 becomes a high-level output from a timing deviated from the pilot signal as a reference by DST specified by the relay operation directions parameters 1716a, for the period of DLEN similarly specified by the relay operation directions parameters 1716a. The transmission timing goes low for the period of the next DLEN and alternately becomes the high and low levels until the interval of the next pilot signal.

Figure 20:
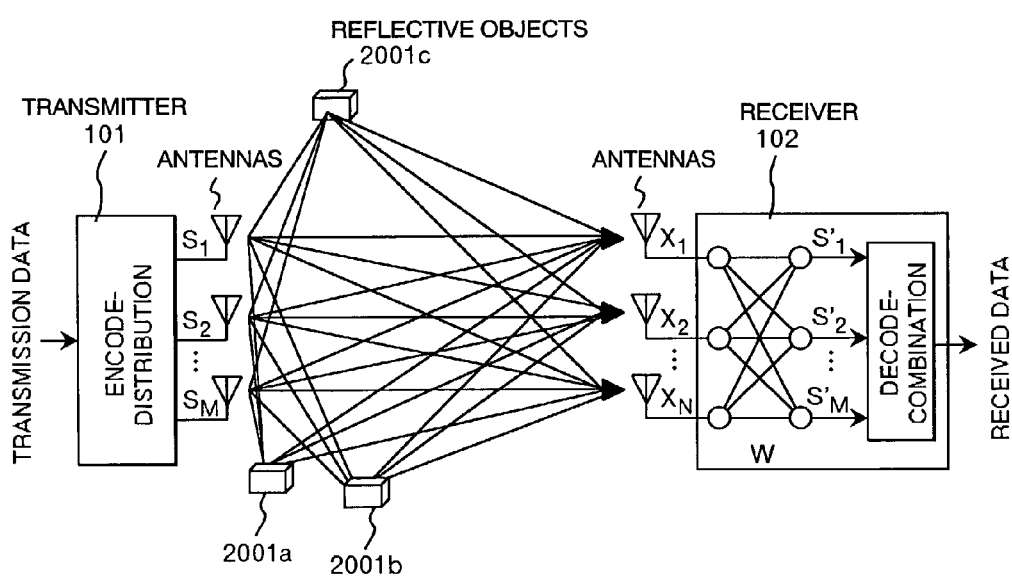
FIG. 20 is a block diagram showing the configuration of another embodiment of a wireless transmission repeater system according to the invention.

FIG. 20 is a block diagram showing the configuration of another embodiment of the wireless transmission repeater system according to the invention. The embodiment obtains substantially the same effects as those of the foregoing embodiment by disposing a plurality of reflectors in specific positions in place of the plurality of repeaters 301 in the wireless transmission repeater system shown in FIG. 3. In the case where either the transmitter 101 or receiver 102 is fixedly mounted, reflectors 2001a, 2001b, and 2001c are disposed in an insight range in which the reflectors 2001a, 2001b, and 2001c can be directly seen from the fixedly mounted device. FIG. 20 will be described on assumption that the transmitter 101 is fixedly mounted. Radio signals transmitted from the transmitter 101 are reflected by the reflectors 2001a, 2001b, and 2001c and reach the receiver 102. By disposing the reflectors 2001a, 2001b, and 2001c, the multipath transmission environment can be artificially generated from the insight transmission environment, so that the communication path capacity can be increased by the MIMO process.

According to the invention, in the mobile communication system using a (MIMO) process of receiving radio signals transmitted from a transmitter so as to be distributed to a plurality of antennas by a receiver via a plurality of antennas and restoring the transmission signals distributed from the transmitter, even in an insight transmission environment in which the transmitter and receiver can see each other directly, by introducing repeaters, a plurality of propagation paths are provided, thereby artificially generating the multipath transmission environment. With the configuration, an effect can be obtained such that the characteristic of the communication path capacity is improved as compared with the insight transmission environment in which repeaters are not introduced.

Figure 19:
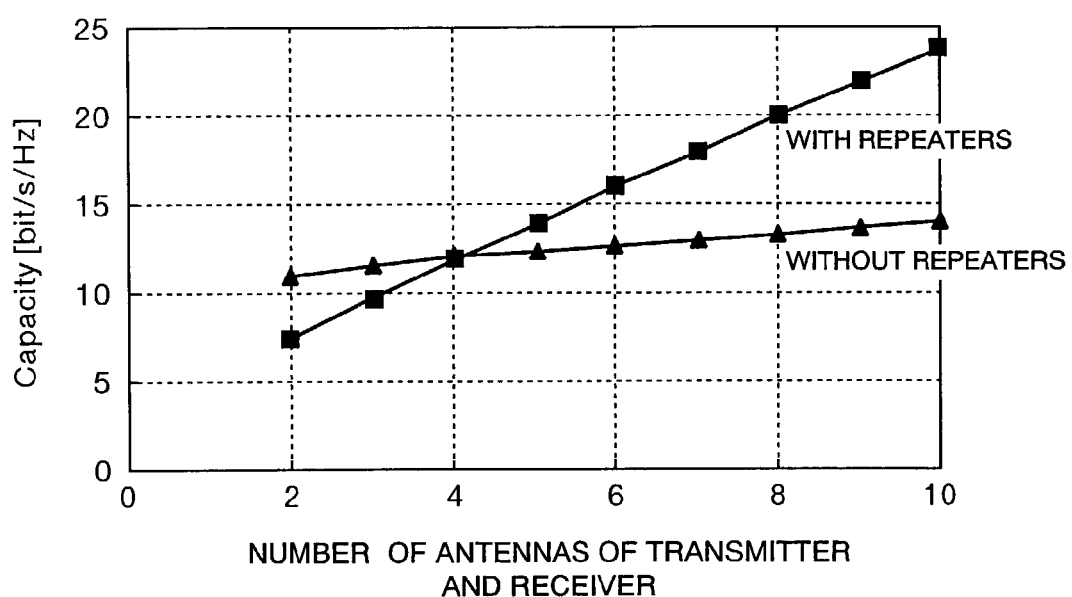
FIG. 19 is a characteristic comparison diagram showing effects of the invention.

FIG. 19 shows the result of comparison between the characteristic of the case where the invention is used (with repeaters) and that of the case where the invention is not applied (without repeaters). The lateral axis denotes the number of antennas of a transmitter and a receiver, and the vertical axis indicates the communication path capacity. It is assumed that the number of antennas of the transmitter and that of the receiver are the same and the number of repeater stations is five times as many as the number of reception antennas, evaluation was made in the environment where the signal-to-noise (S/N) ratio of the propagation path is 30 dB. It is understood from FIG. 19 that when the number of antennas of the transmitter and receiver is four or more, the transmission repeater system using the invention has the better characteristic of the communication path capacity.

While the present invention has been described above in conjunction with the preferred embodiments, one of skill in the art would be enabled by this disclosure to make various modifications to the embodiments and still be within the scope and spirit of the invention as defined in the appended claims.

What is claimed is:

1. A wireless transmission repeater system comprising:
a first wireless device having a transmitter for distributing transmission data including encoded data and a training signal to a plurality of antennas, and transmitting the data as radio signals from said plurality of antennas at a predetermined timing;
a plurality of second wireless devices having repeaters each for receiving said radio signal, storing said radio signal into a buffer so that said radio signal is delayed by a predetermined time, and transmitting said radio signal delayed; and
a third wireless device having a receiver for receiving and combining the radio signals from said plurality of second wireless devices or at least one of said second wireless devices and said first wireless device by a plurality of antennas and demodulating said encoded data by using said training signal multiplexed on the received radio signal and means for parallel-to-serial converting the radio signals received by the plurality of antennas of said third wireless device to combine the radio signals into encoded data, thereby obtaining reception data.

2. A wireless transmission repeater system comprising:
a first wireless device having a transmitter including means for distributing encoded data to a plurality of antennas, means for multiplexing a training signal for restoring the distributed data on a reception side onto said data, and means for controlling a transmission timing, the transmitter transmitting radio signals from the plurality of antennas;
a second wireless device having a repeater including means for receiving the signal transmitted from said first wireless device and storing the signal into a buffer, and means for delaying the stored signal by a predetermined time to thereby control a timing of transmitting the signal; and
a third wireless device having a receiver including means for controlling a reception timing to receive the radio signals transmitted from said second wireless device by a plurality of antennas, means for restoring the data distributed from the transmitter of said first wireless device to the plurality of antennas by using said training signal multiplexed on the received radio signal, and means for parallel-to-serial converting the data distributed to the plurality of antennas to combine the distributed data into encoded data, thereby obtaining reception data.

3. The wireless transmission repeater system according to claim 2, wherein the encoding means of said first wireless device has encoding means for adding redundancy to said encoded data so that error in the data is corrected, and the receiver of said third wireless device has means for performing an error correction decoding process on said encoded data by using said redundancy.

4. The wireless transmission repeater system according to claim 2, wherein said first, second, and third wireless devices are a base station, a repeater station, and a mobile station, respectively,
said mobile station measures a reception power of a pilot signal periodically transmitted from said base station, when the reception power of said pilot signal is equal to or higher than a threshold value, notifies said base station of a demand to start relaying by the repeater station, and when the reception power of said pilot signal is lower than the threshold value, notifies said base station of a demand to stop relaying by the repeater station,
when said relay start demand is received, said base station instructs said repeater station to start the relaying operation, and when said relay stop demand is received, said base station instructs said repeater station to stop the relaying operation.

5. The wireless transmission repeater system according to claim 2, wherein said first, second, and third wireless devices are a base station, a repeater station, and a mobile station, respectively,
said mobile station measures a signal-to-noise ratio of a pilot signal periodically transmitted from said base station, when the signal-to-noise ratio of said pilot signal is equal to or higher than a threshold value, notifies said base station of a demand to start relaying by the repeater station, and when the signal-to-noise ratio of said pilot signal is lower than the threshold value, notifies said base station of a demand to stop relaying by the repeater station,
when said relay start demand is received, said base station instructs said repeater station to start the relaying operation, and when said relay stop demand is received, said base station instructs said repeater station to stop the relaying operation.

6. The wireless transmission repeater system according to claim 2, wherein said first, second, and third wireless devices are a base station, a repeater station, and a mobile station, respectively,
said mobile station measures a signal-to-noise ratio of a pilot signal periodically transmitted from said base station, presumes a propagation path by using said training signal, calculates a communication capacity from said signal-to-noise ratio and the result of said propagation path estimation, when said communication capacity is equal to or lower than a threshold value, notifies said base station of a demand to start relaying by the repeater station, when said communication capacity is higher than the threshold, notifies said base station of a demand to stop the relaying by the repeater station,
when said relay start demand is received, said base station instructs said repeater station to start the relaying operation, and when the relay stop demand is received, said base station instructs said repeater station to stop the relaying operation.

7. The wireless transmission repeater system according to claim 2, wherein the base station notifies the repeater station and the mobile station of an offset of each of a transmission timing of the transmitter, a reception timing and a transmission timing of the repeater, and a reception timing of the receiver with respect to the pilot signal as a reference which is periodically transmitted from said base station by using a control signal, to thereby determine operation timings at the time of relaying operation.

8. A wireless transmission repeater system comprising:
a first wireless device having a transmitter for distributing transmission data including encoded data and a training signal to a plurality of antennas, and transmitting the data as radio signals from said plurality of antennas at a predetermined timing;
a plurality of second wireless devices having repeaters each for receiving said radio signal, storing said radio signal into a buffer so that said radio signal is delayed by predetermined time, and transmitting said radio signal delayed; and a third wireless device having a receiver for receiving the radio signals from said plurality of second wireless devices by a plurality of antennas and demodulating said encoded data by using said training signal multiplexed on the received radio signal, wherein either said first or second wireless device is fixedly mounted in a position, and a reflector for reflecting the radio signal in place of said second wireless device is disposed in an in-sight range in which the reflector can be directly seen from a position of said fixedly disposed wireless device.

9. The wireless transmission repeater system according to claim 2, wherein either said first or second wireless device is fixedly mounted in a position, and a reflector for reflecting the radio signal in place of said second wireless device is disposed in an insight range in which the reflector can be directly seen by said fixedly disposed wireless device.

10. A mobile station for use in a wireless transmission repeater system for performing wireless communication in a Multiple Input Multiple Output (MIMO) communication system in which a plurality of repeater stations are disposed between a mobile station and a base station, comprising:
   a separator for separating a control signal and transmission data from said base station from a reception signal;
   a receiver for restoring the separated transmission data;
   a repeater judgment part for judging whether relaying operation by said plurality of repeater stations is necessary or not based on the control signal from said reception signal;
   a transmitter for generating data to be transmitted and transmitting the data; and
   a control part for controlling said receiver and transmitter by using said control signal, generating a control signal of a relay start demand or a relay stop demand to said base station in accordance with a result of judgment of said relay judgment part, and adding the control signal of said relay start demand or relay stop demand to said data to be transmitted.

11. A base station for use in a wireless transmission repeater system for performing wireless communication in accordance with a Multiple Input, Multiple Output (MIMO) communication system, in which a plurality of repeater stations are disposed between a mobile station and a base station, comprising:
   a separator for separating a control signal and transmission data from said base station from a reception signal;
   a receiver for restoring the separated transmission data;
   a repeater judgment part for judging whether relaying operation by said plurality of repeater stations is necessary or not on the basis of the control signal from said reception signal;
   a transmitter for generating data to be transmitted and transmitting the data; and
   a control part for controlling said receiver and transmitter by using said control signal, generating a control signal of a relay operation instruction to said base station and repeater station in accordance with a result of judgment of said relay judgment part, and adding the control signal of said operation instruction to said data to be transmitted.

12. A repeater station for use in a wireless transmission repeater system for performing wireless communication in accordance with a Multiple Input, Multiple Output (MIMO) communication system, in which a plurality of repeater stations are disposed between a mobile station and a base station, comprising:

a separator for separating a control signal and transmission data from said mobile station or base station from a reception signal;
a repeater for buffering the separated transmission data;
a repeater judgment part for judging whether relaying operation is necessary or not by measuring a power of a base station pilot signal included in said control signal or said transmission data;
a calculation part for obtaining a transmission timing by using said base station pilot signal; and
a transmitter for transmitting transmission data of said repeater at said transmission timing.

13. The base station according to claim 11, further comprising a transmission/reception part for performing a wireless communication which is not according to the MIMO communication system.

14. A Multiple Input, Multiple Output (MIMO) receiver station comprising:
   a plurality of antennas for receiving radio signals;
   a separator for separating a control signal and transmission data included in the received signals; and
   a reception unit for demodulating said transmission data by use of said control signal,
   wherein said plurality of antennas receive signals from an MIMO transmission station and at least a repeater, or a plurality of repeaters,
   wherein said MIMO transmission station distributes transmission signals including said control signal and transmission data to be transmitted from a plurality of antennas,
   wherein said repeater repeats signals received from said MIMO transmission station, and
   wherein said reception unit combines signals received from said MIMO transmission station and at least one said repeater, or said plurality of repeaters to reconstruct said transmission data by conductinQ a rarallel-to-serial conversion of the signals received from said MIMO transmission station into serial data, thereby obtaining reconstructed transmission data.

15. A wireless transmission repeater system comprising:
   a first wireless device having a transmitter including means for distributing encoded data to a plurality of antennas, means for multiplexing a training signal for restoring the distributed data on a reception side onto said data, and means for controlling a transmission timing, the transmitter for transmitting radio signals from the plurality of antennas;
   a second wireless device having a repeater including means for receiving the signal transmitted from said first wireless device and storing the signal into a buffer, and means for delaying the stored signal by predetermined time to thereby control a timing of transmitting the signal; and
   a third wireless device having a receiver including means for controlling a reception timing to receive the radio signals transmitted from said second wireless device and said first wireless device by a plurality of antennas, means for restoring the data distributed from the transmitter of said first wireless device to the plurality of antennas by using said training signal multiplexed on the received radio signal, and means for parallel-to-serial converting the data distributed to the plurality of antennas to combine the distributed data into encoded data, thereby obtaining reception data.

16. A mobile station for use in a wireless transmission repeater system for performing wireless communication in a Multiple Input Multiple Output (MIMO) communication system in which a plurality of repeater stations are disposed between a mobile station and a base station, comprising:

a separator for separating a control signal and transmission data from said base station from a reception signal;

a receiver for restoring the separated transmission data;

a repeater judgment part for judging whether relaying operation by said plurality of repeater stations is necessary or not based on a reception condition of a signal received from said base station;

a transmitter for generating data to be transmitted and transmitting the data; and a control part for controlling said receiver and transmitter by using said control signal, generating a control signal of a relay start demand or a relay stop demand to said base station in accordance with a result of judgment of said relay judgment part, and adding the control signal of said relay start demand or relay stop demand to said data to be transmitted.

* * * * *